US011838904B2

(12) United States Patent
Vieira et al.

(10) Patent No.: US 11,838,904 B2
(45) Date of Patent: *Dec. 5, 2023

(54) APPROACHES FOR BEAM SELECTION

(71) Applicant: Telefonaktiebolaget LM Ericsson (publ), Stockholm (SE)

(72) Inventors: Joao Vieira, Hjarup (SE); Dzevdan Kapetanovic, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/472,050

(22) Filed: Sep. 10, 2021

(65) Prior Publication Data

US 2022/0141812 A1 May 5, 2022

Related U.S. Application Data

(63) Continuation of application No. 16/314,515, filed as application No. PCT/EP2018/083166 on Nov. 30, 2018, now Pat. No. 11,122,571.

(51) Int. Cl.
*H04B 7/0408* (2017.01)
*H04B 7/06* (2006.01)
(Continued)

(52) U.S. Cl.
CPC ........ *H04W 72/046* (2013.01); *H04B 7/0408* (2013.01); *H04B 7/0617* (2013.01);
(Continued)

(58) Field of Classification Search
CPC ... H04B 7/02–12; H04B 17/0082–3913; H04J 11/0023–0093;
(Continued)

(56) References Cited

U.S. PATENT DOCUMENTS 11,122,571 B2 * 9/2021 Vieira ................. H04W 72/046
2006/0279460 A1 12/2006 Yun et al.
(Continued)

FOREIGN PATENT DOCUMENTS

EP 1062746 A2 12/2000
EP 1631100 A1 3/2006
(Continued)

OTHER PUBLICATIONS

PCT International Search Report, dated Feb. 25, 2019, in connection with International Application No. PCT/EP2018/064529, all pages (Previously made of record in parent application (Previously made of record in parent application, so unnecessary to submit copy herewith).
(Continued)

*Primary Examiner* — Timothy J Weidner
(74) *Attorney, Agent, or Firm* — LEFFLER INTELLECTUAL PROPERTY LAW, PLLC

(57) ABSTRACT

A method is disclosed for a system comprising a transmitter apparatus and a receiver apparatus. The transmitter apparatus is configured to transmit signals to the receiver apparatus using an available transmission beam. The receiver apparatus is configured to receive the signals using an available reception beam. The method comprises the transmitter apparatus determining a collection of linear combinations of transmission beams and a collection of linear combinations of reception beams, providing an indication of the collection of linear combinations of reception beams to the receiver apparatus and transmitting each of the linear combinations of transmission beams of the collection of linear combinations of transmission beams. The method also comprises the receiver apparatus acquiring the indication of the collection of linear combinations of reception beams from the transmitter apparatus, receiving each of the linear combinations
(Continued)

of transmission beams of the collection of linear combinations of transmission beams using each of the linear combinations of reception beams of the collection of linear combinations of reception beams, and performing beam selection measurements on the received linear combinations of transmission beams for selection of the transmission beam from the plurality of available transmission beams and for selection of the reception beam from the plurality of available reception beams. Methods for each of the transmitter apparatus and the receiver apparatus are also disclosed, as well as corresponding apparatuses, network node, wireless communication device, system and computer program product.

18 Claims, 7 Drawing Sheets

(51) Int. Cl.

| | | |
|---|---|---|
| *H04B 7/08* | (2006.01) | |
| *H04B 17/309* | (2015.01) | |
| *H04B 17/382* | (2015.01) | |
| *H04B 17/391* | (2015.01) | |
| *H04W 16/28* | (2009.01) | |
| *H04W 24/10* | (2009.01) | |
| *H04W 72/04* | (2023.01) | |
| *H04W 84/02* | (2009.01) | |
| *H04W 88/02* | (2009.01) | |
| *H04W 88/08* | (2009.01) | |
| *H04W 92/10* | (2009.01) | |
| *H04W 72/044* | (2023.01) | |

(52) U.S. Cl.
CPC ......... *H04B 7/0639* (2013.01); *H04B 7/0695* (2013.01); *H04B 7/088* (2013.01); *H04B 17/309* (2015.01); *H04B 17/382* (2015.01); *H04B 17/3912* (2015.01); *H04W 16/28* (2013.01); *H04W 24/10* (2013.01); *H04W 84/02* (2013.01); *H04W 88/02* (2013.01); *H04W 88/08* (2013.01); *H04W 92/10* (2013.01)

(58) Field of Classification Search
CPC .. H04J 2011/0003–0096; H04L 5/0091–0098; H04W 16/28; H04W 24/02–10; H04W 72/04–10; H04W 84/02–16; H04W 88/02–12; H04W 92/02; H04W 92/04; H04W 92/10
See application file for complete search history.

(56) References Cited

U.S. PATENT DOCUMENTS

| | | |
|---|---|---|
| 2007/0049218 A1 | 3/2007 | Gorokhov et al. |
| 2008/0232501 A1 | 9/2008 | Khojastepour et al. |
| 2010/0150266 A1 | 6/2010 | Mondal et al. |
| 2014/0187168 A1 | 7/2014 | Seol et al. |
| 2014/0198681 A1* | 7/2014 | Jung .................. H04W 72/042 |
| 2015/0311971 A1 | 10/2015 | Learned et al. |
| 2016/0127919 A1 | 5/2016 | Hui et al. |
| 2016/0142117 A1 | 5/2016 | Rahman et al. |
| 2018/0049042 A1 | 2/2018 | Yu et al. |
| 2018/0131486 A1 | 5/2018 | Liu et al. |
| 2019/0103904 A1 | 4/2019 | Song et al. |
| 2021/0314046 A1* | 10/2021 | Kim .................. H04W 72/0413 |

FOREIGN PATENT DOCUMENTS

| | | |
|---|---|---|
| EP | 3316493 A1 | 5/2018 |
| WO | 9914780 A2 | 3/1999 |
| WO | 2009003423 A1 | 1/2009 |

OTHER PUBLICATIONS

PCT Written Opinion, dated Feb. 25, 2019, in connection with International Application No. PCT/EP2018/064529, all pages( Previously made of record in parent application (Previously made of record in parent application, so unnecessary to submit copy herewith).
PCT International Search Report, dated Aug. 6, 2019, in connection with International Application No. PCT/EP2018/083166, all pages (Previously made of record in parent application (Previously made of record in parent application, so unnecessary to submit copy herewith).
PCT Written Opinion, dated Aug. 6, 2019, in connection with International Application No. PCT/EP2018/083166, all pages (Previously made of record in parent application (Previously made of record in parent application, so unnecessary to submit copy herewith).
3GPP TSG RAN WG1 Vice Chairman (Samsung): "NR Physical Layer Design: NR MIMO", 3GPP RAN Workshop on 3GPP submission towards IMT-2020, Brussels, Belgium, Oct. 24-25, 2018, pp. 1-23 (Previously made of record in parent application, so unnecessary to submit copy herewith).
PCT International Search Report, dated Apr. 1, 2020, in connection with International Application No. PCT/EP2019/072214, all pages (Previously made of record in parent application (Previously made of record in parent application, so unnecessary to submit copy herewith).
PCT Written Opinion, dated Apr. 1, 2020, in connection with International Application No. PCT/EP2019/072214, all pages (Previously made of record in parent application (Previously made of record in parent application, so unnecessary to submit copy herewith).
Yu Zhang et al., "Channel Estimation and Hybrid Precoding for Distributed Phased Arrays Based MIMO Wireless Communications", Arxiv.org, Cornell University Library, Mar. 14, 2019, pp. 1-30 (Previously made of record in parent application, so unnecessary to submit copy herewith).
Liang Zhou et al., "Fast Codebook-Based Beamforming Training for mmWave MIMO Systems with Subarray Structures", 2015 IEEE 82nd Vehicular Technology Conference, Sep. 6, 2015, pp. 1-5 (Previously made of record in parent application, so unnecessary to submit copy herewith).
Didi Zhang et al., "Millimeter Wave Channel Estimation Based on Subspace Fitting", IEEE Access, vol. 6, Nov. 30, 2018, pp. 76126-76139 (Previously made of record in parent application, so unnecessary to submit copy herewith).
Non-Final Office Action dated May 13, 2021 in connection with U.S. Appl. No. 16/080,517, 28 pages (Previously made of record in parent application, so unnecessary to submit copy herewith).
Final Office Action dated Aug. 20, 2021 in connection with U.S. Appl. No. 16/080,517, 20 pages.
Non-Final Office Action dated Mar. 21, 2022 in connection with U.S. Appl. No. 16/080,517, 27 pages.
Non-Final Office Action dated Aug. 16, 2023 in connection with U.S. Appl. No. 17/634,971, 28 pages.

\* cited by examiner

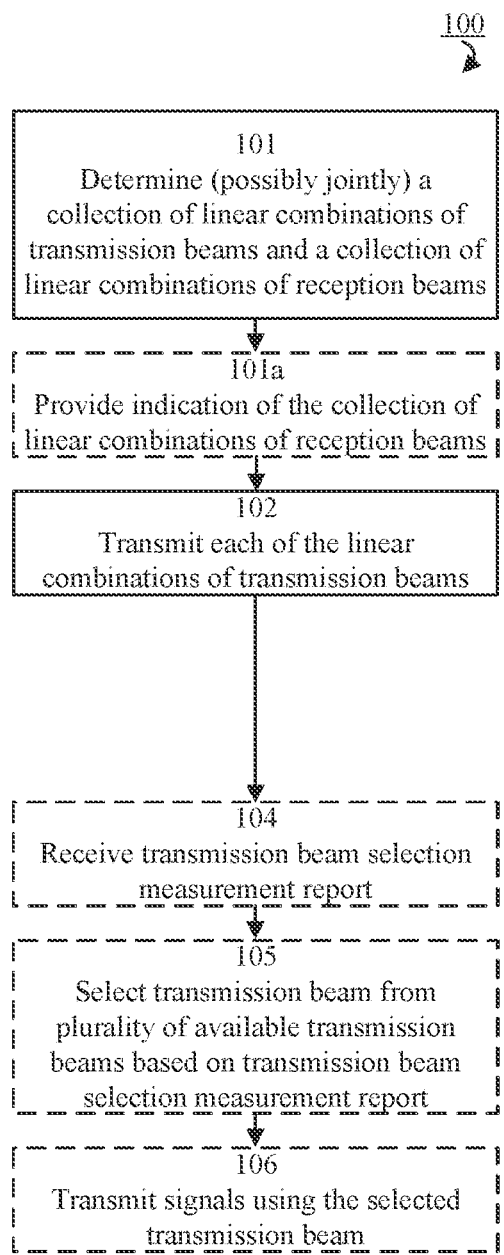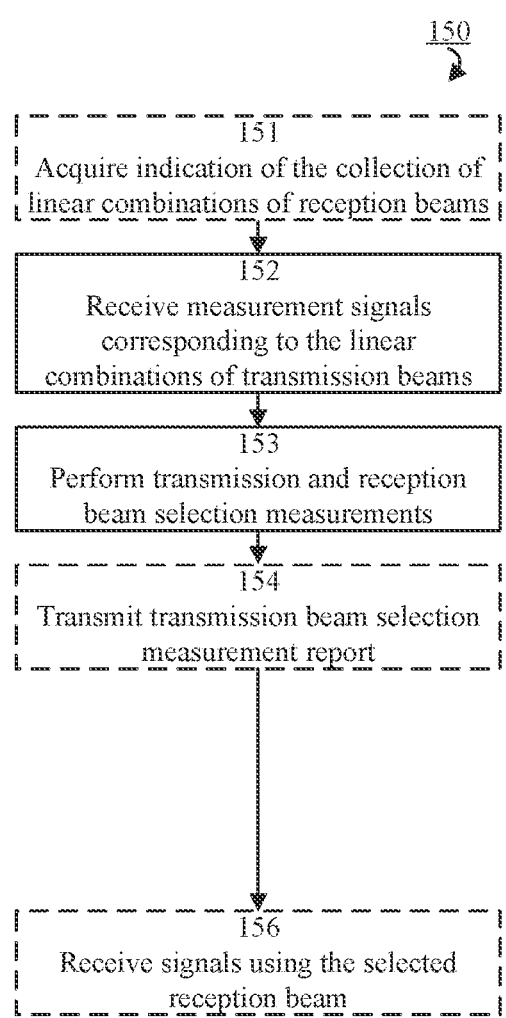
FIG. 1A
FIG. 1B

APPROACHES FOR BEAM SELECTION

CROSS-REFERENCE TO RELATED APPLICATIONS

This application claims the benefit of U.S. application Ser. No. 16/314,515, filed Dec. 31, 2018 (371(c) date), which is a 371 National Stage Application of PCT/EP2018/083166, filed Nov. 30, 2018. Both of these earlier applications are hereby incorporated herein by reference in their entireties.

TECHNICAL FIELD

The present disclosure relates generally to the field of wireless communication. More particularly, it relates to approaches for beam selection in relation to beam forming applied in wireless communication.

BACKGROUND

In wireless communication standards that rely on beamforming (e.g., fifth generation (5G), new radio (NR), IEEE 802.11ay, etc.), an important procedure for the base station (BS) is to find the best (or at least a good enough) transmission beam towards each user equipment (UE) that it serves, and for each UE to find the best (or at least a good enough) reception beam for reception from the BS. This is usually achieved by some type of training transmissions (also referred to as beam training or beam sweeping).

One way to implement such a procedure (which is used in IEEE 802.11ac, for example) is to let the BS transmit orthogonal beams, and let the UE estimate—for each reception beam—the downlink (DL) channel and/or received signal-to-noise ratio (SNR) based on the transmission. Then the UE can send reports to the BS indicative of the estimation and/or a desired beam selection determined based on the estimation. This process may be referred to as beam sweeping.

The number of orthogonal transmission beams that must be transmitted, as well as the number of orthogonal reception beams that must be used for reception, in such a training implementation are, typically, in the order of (e.g., equals or are at most equal to) the number of antennas (or antenna elements) at the BS multiplied by the number of antennas (or antenna elements) at the UE. Thus, this approach may be useful when there is a low or moderate number of antenna elements. However, for situations with a large number of antenna elements (e.g., massive multiple-input multiple-output, MIMO), the number of beams becomes large which makes this approach cumbersome. For example, a substantial amount of time may need to be allocated for the training transmissions and receptions and the training contribute with a large amount of overhead signaling, both of which may impair system capacity.

In such situations, the BS may instead transmit a lower number of transmission beams than in the implementation referred to above; e.g., beams of a transmission codebook that contains less than all transmission beams and that preferably span as much as possible of the entire BS antenna space. This process may also be referred to as beam sweeping.

The UE may similarly use a lower number of reception beams than in the implementation referred to above; e.g., beams of a reception codebook that contains less than all possible reception beams and that preferably span as much as possible of the entire UE antenna space.

Thus, beam sweeping may be implemented such that the BS transmits on one of the transmit beams of the transmission codebook at a time, and the UE receives on one of the reception beam of the reception codebook at a time. Then, the UE may signal, to the BS, the index of the transmission beam that is part of the transmission/reception beam pair that achieves the best performance as measured at the UE.

Even in this approach, however, the amount of time and/or signaling overhead of the training may be substantial.

Therefore, there is a need for more efficient approaches for beam selection. Preferably, such approaches require less time allocation and/or less signaling overhead than other approaches. Also preferable, such approaches achieve the same results concerning beam selection (e.g., in terms of signal-to-noise ratio, SNR, when the selected beams are used). If approaches achieve deteriorated results concerning beam selection, it is preferable that the deterioration is minimal, or at least not substantial.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method for a transmitter apparatus configured to transmit signals to a receiver apparatus using a transmission beam selected from a plurality of available transmission beams, wherein the receiver apparatus is configured to receive the signals using a reception beam selected from a plurality of available reception beams. A set of the available transmission beams and a set of the available reception beams are for beam selection measurements by the receiver apparatus.

The method comprises determining a collection of linear combinations of transmission beams of the set of the available transmission beams and determining a collection of linear combinations of reception beams of the set of available reception beams.

The method also comprises providing an indication of the collection of linear combinations of reception beams to the receiver apparatus, and transmitting each of the linear combinations of transmission beams of the collection of linear combinations of transmission beams for beam selection measurements by the receiver apparatus.

In some embodiments, the collection of linear combinations of transmission beams and the collection of linear combinations of reception beams are determined jointly.

In some embodiments, a cardinality of the collection of linear combinations of transmission beams is lower than a cardinality of the set of the available transmission beams and/or a cardinality of the collection of linear combinations of reception beams is lower than a cardinality of the set of the available reception beams.

In some embodiments, the determination of the collection of linear combinations of transmission beams and the collection of linear combinations of reception beam comprises determining the cardinality of the collection of linear combinations of transmission beams and/or the cardinality of the collection of linear combinations of reception beam based on one or more of: a sparsity of a channel between the transmitter apparatus and the receiver apparatus, and properties of a compression matrix representing the collection of linear combinations of transmission beams and the collection of linear combinations of reception beams.

In some embodiments, the method further comprises receiving a transmission beam selection measurement report from the receiver apparatus, and selecting the transmission beam from the plurality of available transmission beams in accordance with the received transmission beam selection measurement report.

In some embodiments, at least one of the linear combinations of transmission beams of the collection of linear combinations of transmission beams is a linear combination of at least two of the transmission beams of the set of the available transmission beams.

In some embodiments, at least one of the linear combinations of reception beams of the collection of the collection of linear combinations of reception beams is a linear combination of at least two of the reception beams of the set of the available reception beams.

In some embodiments, each of the linear combinations of transmission beams of the collection of linear combinations of transmission beams is a unique linear combination of all of the transmission beams of the set of the available transmission beams.

In some embodiments, each of the linear combinations of reception beams of the collection of the collection of linear combinations of reception beams is a unique linear combination of all of the reception beams of the set of the available reception beams.

In some embodiments, the collection of linear combinations of transmission beams is defined by a Grassmannian coding matrix.

In some embodiments, the collection of linear combinations of reception beams is defined by a Grassmannian coding matrix.

In some embodiments, the collection of linear combinations of transmission beams, representable by a matrix $B_{TX}$, and the collection of linear combinations of reception beams, representable by a matrix $B_{RX}$, are determined such that $A^H A$ is a substantially block diagonal matrix, wherein $A=B_{TX} \otimes B_{RX}$ where $\otimes$ represents a Kronecker product.

In some embodiments, the set of the available transmission beams consists of a minimum number of transmission beams spanning the plurality of available transmission beams.

In some embodiments, the set of the available reception beams consists of a minimum number of reception beams spanning the plurality of available reception beams.

In some embodiments, the set of the available transmission beams and/or the set of the available reception beams comprises discrete Fourier transform (DFT) beams, wherein a beam direction of any DFT beam corresponds to a harmonic frequency.

In some embodiments, transmitting each of the linear combinations of transmission beams comprises one or more of: transmitting each of the linear combinations of transmission beams of the collection of linear combinations of transmission beams in a respective transmission time resource (at least some of the respective time resources being different), and transmitting each of the linear combinations of transmission beams of the collection of linear combinations of transmission beams in a respective transmission frequency resource (at least some of the respective frequency resources being different).

In some embodiments, the method is applied during a training phase for beam selection.

An alternative to the first aspect is a method for a transmitter apparatus configured to transmit signals to a receiver apparatus using a transmission beam selected from a plurality of available transmission beams, wherein the receiver apparatus is configured to receive the signals using a reception beam selected from a plurality of available reception beams. A set of the available transmission beams and a set of the available reception beams are for beam selection measurements by the receiver apparatus.

The method comprises determining a collection of linear combinations of transmission beams of the set of the available transmission beams and determining a collection of linear combinations of reception beams of the set of available reception beams. The collection of linear combinations of transmission beams and the collection of linear combinations of reception beams are determined jointly.

The method also comprises, transmitting each of the linear combinations of transmission beams of the collection of linear combinations of transmission beams for beam selection measurements by the receiver apparatus.

In some embodiments, the method further comprises providing an indication of the collection of linear combinations of reception beams to the receiver apparatus.

This alternative may additionally have features identical with or corresponding to any of the various features as explained above for the first aspect.

Furthermore, this alternative is also applicable mutatis mutandis to the other aspects described in the following.

A second aspect is a method for a receiver apparatus configured to receive signals from a transmitter apparatus via a transmission beam selected from a plurality of available transmission beams and using a reception beam selected from a plurality of available reception beams. A set of the available transmission beams and a set of the available reception beams are for beam selection measurements by the receiver apparatus.

The method comprises acquiring, from the transmitter apparatus, an indication of a collection of linear combinations of reception beams of the set of the available reception beams.

The method also comprises receiving, using each of the linear combinations of reception beams of the collection of linear combinations of reception beams, a number of measurement signals for beam selection measurements from the transmitter apparatus. The number of measurement signals correspond to a collection of linear combinations of transmission beams of the set of available transmission beams.

Furthermore, the method comprises performing beam selection measurements on the number of measurement signals for selection of the transmission beam from the plurality of available transmission beams and for selection of the reception beam from the plurality of available reception beams.

In some embodiments, the method further comprises transmitting a transmission beam selection measurement report to the transmitter apparatus for selection of the transmission beam from the plurality of available transmission beams.

In some embodiments, performing beam selection measurements comprises determining a quality metric for each combination of a transmission beam of the set of available transmission beams and a reception beam of the set of available reception beams based on the beam selection measurements.

In some embodiments, performing beam selection measurements comprises subjecting the number of received measurement signals to matched filtering based on the collection of linear combinations of transmission beams and the collection of linear combinations of reception beam.

A third aspect is a method for a system comprising a transmitter apparatus and a receiver apparatus, wherein the transmitter apparatus is configured to transmit signals to the receiver apparatus using a transmission beam selected from a plurality of available transmission beams, and wherein the receiver apparatus is configured to receive the signals using a reception beam selected from a plurality of available reception beams. A set of the available transmission beams and a set of the available reception beams are for beam selection measurements by the receiver apparatus.

The method comprises determining (by the transmitter apparatus) a collection of linear combinations of transmission beams of the set of the available transmission beams and a collection of linear combinations of reception beams of the set of available reception beams.

The method also comprises providing (by the transmitter apparatus to the receiver apparatus) an indication of the collection of linear combinations of reception beams, and acquiring (by the receiver apparatus from the transmitter apparatus) the indication of the collection of linear combinations of reception beams.

Furthermore, the method comprises transmitting (by the transmitter apparatus) each of the linear combinations of transmission beams of the collection of linear combinations of transmission beams, and receiving (by the receiver apparatus) each of the linear combinations of transmission beams of the collection of linear combinations of transmission beams using each of the linear combinations of reception beams of the collection of linear combinations of reception beams.

The method also comprises performing (by the receiver apparatus) beam selection measurements on the received linear combinations of transmission beams for selection of the transmission beam from the plurality of available transmission beams and for selection of the reception beam from the plurality of available reception beams.

A fourth aspect is a computer program product comprising a non-transitory computer readable medium, having thereon a computer program comprising program instructions. The computer program is loadable into a data processing unit and configured to cause execution of the method according to any of the first, second and third aspects when the computer program is run by the data processing unit.

A fifth aspect is a transmitter apparatus configured to transmit signals to a receiver apparatus using a transmission beam selected from a plurality of available transmission beams, wherein the receiver apparatus is configured to receive the signals using a reception beam selected from a plurality of available reception beams. A set of the available transmission beams and a set of the available reception beams are for beam selection measurements by the receiver apparatus.

The apparatus comprises controlling circuitry configured to cause determination of a collection of linear combinations of transmission beams of the set of the available transmission beams, and determination of a collection of linear combinations of reception beams of the set of available reception beams.

The controlling circuitry is also configured to cause provision of an indication of the collection of linear combinations of reception beams to the receiver apparatus, and transmission of each of the linear combinations of transmission beams of the collection of linear combinations of transmission beams for beam selection measurements by the receiver apparatus.

The fifth aspect may be formulated as the transmitter apparatus comprising a determiner, a provider, and a transmitter. The determiner is configured to determine a collection of linear combinations of transmission beams of the set of the available transmission beams, and a collection of linear combinations of reception beams of the set of available reception beams. The provider is configured to provide an indication of the collection of linear combinations of reception beams to the receiver apparatus. The transmitter is configured to transmit each of the linear combinations of transmission beams of the collection of linear combinations of transmission beams for beam selection measurements by the receiver apparatus.

A sixth aspect is a receiver apparatus configured to receive signals from a transmitter apparatus via a transmission beam selected from a plurality of available transmission beams and using a reception beam selected from a plurality of available reception beams. A set of the available transmission beams and a set of the available reception beams are for beam selection measurements by the receiver apparatus.

The apparatus comprises controlling circuitry configured to cause acquisition, from the transmitter apparatus, of an indication of a collection of linear combinations of reception beams of the set of the available reception beams.

The controlling circuitry is also configured to cause reception, using each of the linear combinations of reception beams of the collection of linear combinations of reception beams, of a number of measurement signals for beam selection measurements from the transmitter apparatus. The number of measurement signals correspond to a collection of linear combinations of transmission beams of the set of available transmission beams.

Furthermore, the controlling circuitry is configured to cause performance of beam selection measurements on the number of measurement signals for selection of the transmission beam from the plurality of available transmission beams and for selection of the reception beam from the plurality of available reception beams.

The sixth aspect may be formulated as the receiver apparatus comprising an acquirer, a receiver, and a measurer. The acquirer is configured to acquire, from the transmitter apparatus, an indication of a collection of linear combinations of reception beams of the set of the available reception beams. The receiver is configured to receive, using each of the linear combinations of reception beams of the collection of linear combinations of reception beams, a number of measurement signals for beam selection measurements from the transmitter apparatus. The number of measurement signals correspond to a collection of linear combinations of transmission beams of the set of available transmission beams. The measurer is configured to perform beam selection measurements on the number of measurement signals for selection of the transmission beam from the plurality of available transmission beams and for selection of the reception beam from the plurality of available reception beams.

A seventh aspect is a network node comprising the transmitter apparatus of the fifth aspect and/or the receiver apparatus of the sixth aspect.

An eighth aspect is a wireless communication device comprising the transmitter apparatus of the fifth aspect and/or the receiver apparatus of the sixth aspect.

A ninth aspect is a system comprising a transmitter apparatus and a receiver apparatus, wherein the transmitter apparatus is configured to transmit signals to the receiver apparatus using a transmission beam selected from a plurality of available transmission beams, and wherein the receiver apparatus is configured to receive the signals using a reception beam selected from a plurality of available reception beams. A set of the available transmission beams and a set of the available reception beams are for beam selection measurements by the receiver apparatus.

The transmitter apparatus is configured to determine a collection of linear combinations of transmission beams of the set of the available transmission beams and determine a collection of linear combinations of reception beams of the set of available reception beams.

The transmitter apparatus is also configured to provide (to the receiver apparatus) an indication of the collection of linear combinations of reception beams, and transmit each of the linear combinations of transmission beams of the collection of linear combinations of transmission beams.

The receiver apparatus is configured to acquire (from the transmitter apparatus) the indication of the collection of linear combinations of reception beams, and receive each of the linear combinations of transmission beams of the collection of linear combinations of transmission beams using each of the linear combinations of reception beams of the collection of linear combinations of reception beams.

The receiver apparatus is also configured to perform beam selection measurements on the received linear combinations of transmission beams for selection of the transmission beam from the plurality of available transmission beams and for selection of the reception beam from the plurality of available reception beams.

In some embodiments, any of the above aspects may additionally have features identical with or corresponding to any of the various features as explained above for any of the other aspects.

An advantage of some embodiments is that alternative approaches for beam selection are provided.

The alternative approaches may, in some embodiments, be more efficient than other approaches for beam selection. Efficiency may, for example, be in terms of the amount of time and/or signaling overhead needed for beam training.

The alternative approaches may, in some embodiments, require less resource (e.g., time and/or frequency) allocation and/or less signaling overhead than other approaches for beam selection.

The alternative approaches may, in some embodiments, achieve beam selection that is not severely deteriorated compared to other approaches for beam selection (e.g., in terms of resulting received SNR of the selected beam).

An advantage of some embodiments is that a significant reduction of training overhead for beam sweeping may be achieved at the cost of a marginal increase in error probability for detecting the best combination of transmission-reception beams.

Yet an advantage of some embodiments is that the amount of energy emitted in connection with the beam training may be reduced, thereby reducing interference generated for other wireless communications using the same communication medium.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

FIG. 1A is a flowchart illustrating example method steps according to some embodiments;

FIG. 1B is a flowchart illustrating example method steps according to some embodiments;

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As mentioned above, the amount of time and/or signaling overhead of the training for beam forming selection may be substantial.

For example, if the BS is assumed to have a large antenna array (e.g., 64 antennas or more), the beam sweeping procedure typically consumes many resources since there are many beams to transmit from the BS even if only beams of a transmission codebook that contains less than all transmission beams are included in the beam sweep. If the UE also has a relatively large reception codebook of reception beams, the beam sweeping procedure is even longer.

If $N_{BS}$ denotes the number of transmission beams in the beam sweeping codebook at the BS and $N_{UE}$ denotes the number of reception beams in the beam sweeping codebook at the UE, the beam sweeping training performed in downlink (DL) comprises testing $N_{BS}N_{UE}$ beam combinations (and similarly for the uplink, UL). Clearly, if both $N_{BS}$ and $N_{UE}$ are large, the resulting product is also large.

Therefore, there is a need for more efficient approaches for beam selection. Such approaches may aim at reducing the number of beam combinations that are tested in the beam sweeping, while achieving the same, or only slightly inferior beam selection.

It should be noted that even though embodiments are described herein as used during a beam forming training period, it may (alternatively or additionally) be equally applicable during other periods, e.g., during periods of data transmission.

In the following, embodiments will be described where alternative approaches for beam selection are provided.

Figure 1C:
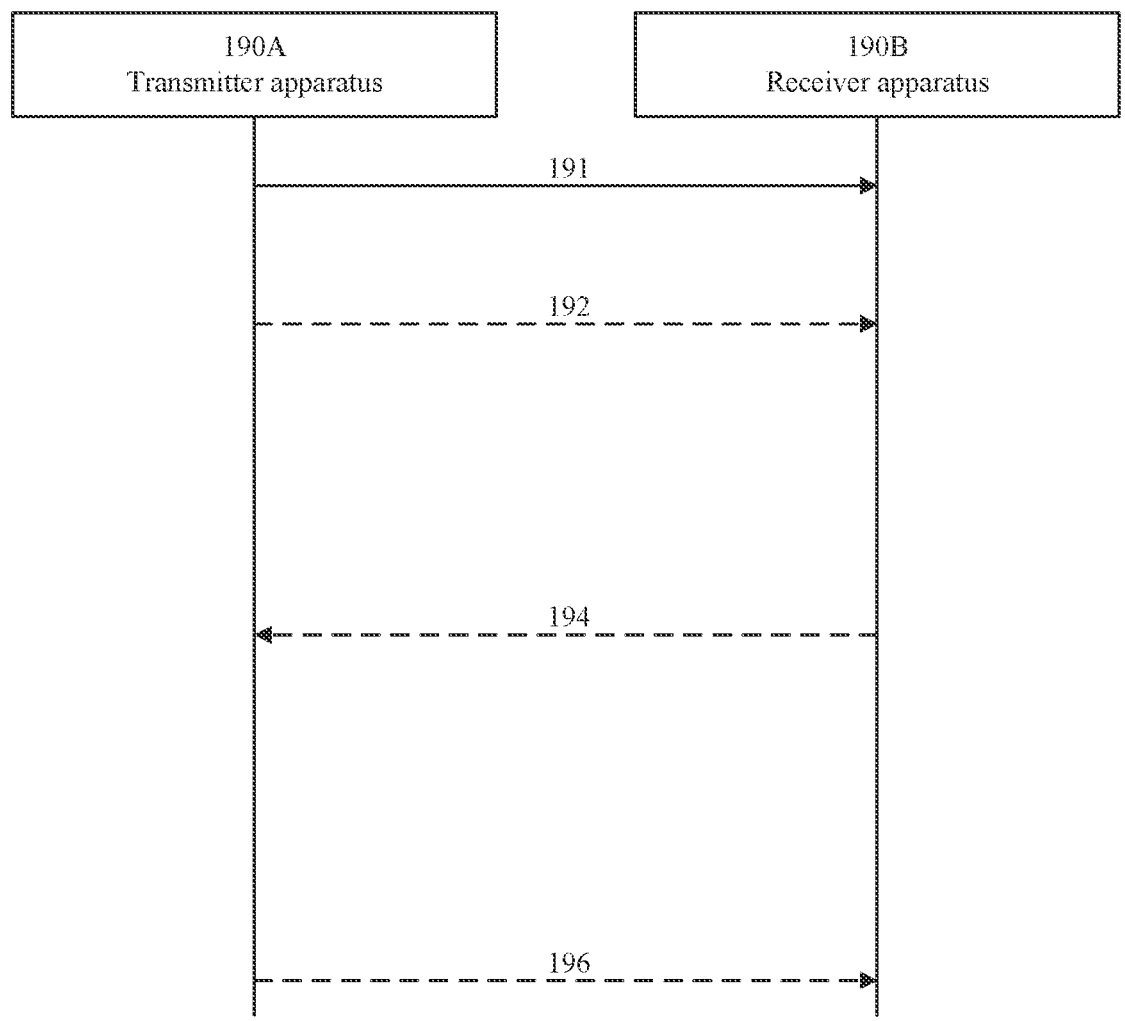
FIG. 1C is a signaling diagram illustrating example signaling according to some embodiments.

FIG. 1A illustrates an example method 100 according to some embodiments, FIG. 1B illustrates an example method 100 according to some embodiments, and FIG. 1C illustrates example signaling according to some embodiments. The methods and the signaling may be applied only during a training phase for beam selection, according to some embodiments. Alternatively, the methods and the signaling may be applied during a training phase for beam selection and during other periods, e.g., during periods of data transmission. Yet alternatively, the methods and the signaling may be applied only during periods other that the trading phase, e.g., during periods of data transmission.

The example method 100 is for a transmitter apparatus, the method 150 is for a receiver apparatus, and the example signaling is between the transmitter apparatus 190A and the receiver apparatus 190B. The transmitter apparatus is configured to transmit signals to the receiver apparatus using a transmission beam selected from a plurality of available transmission beams. The receiver apparatus is configured to receive signals from the transmitter apparatus via a transmission beam selected from a plurality of available transmission beams and using a reception beam selected from a plurality of available reception beams.

Typically, the plurality of available transmission beams may comprise all possible beams for transmission from the transmitter apparatus, and the plurality of available reception beams may comprise all possible beams for reception at the receiver apparatus.

A set of the available transmission beams and a set of the available reception beams are for beam selection measurements by the receiver apparatus. Thus, these sets are the sets of beams used for beam training. The set may comprise all transmission/reception beams in the plurality of available transmission/reception beams or a subset of the plurality of available transmission/reception beams. In some embodiments, the beams of each of the sets are orthogonal, but this is not necessarily true for all embodiments.

In some embodiments, the beams of each of the sets span a space where all of the transmission/reception beams of the plurality of available transmission/reception beams reside. When used herein, the term "spanning a space" is meant to encompass any known and suitable mathematical definition of this term. Typically, each of the sets of beams consists of a minimum number of transmission/reception beams spanning the plurality of available transmission/reception beams (i.e., the space where all of the beams of the plurality of available transmission/reception beams reside). For example, the sets may correspond to the beam sweeping codebooks at the transmitter apparatus and at the receiver apparatus, respectively.

Each of the sets of the plurality of available transmission/reception beams may, for example, comprise discrete Fourier transform (DFT) beams, wherein a beam direction of any beam in the set corresponds to a harmonic frequency. DFT beams can be constructed to span the whole antenna space (e.g., by choosing harmonic frequencies of the DFT as angles for the beams), and they have constant amplitude on each antenna (which is desirable from a power amplifier (PA) point of view).

Moreover, the channel itself can typically be expressed as a weighted combination of DFT beams with different angles. Due to this channel decomposition property, some DFT beams are expected to be well aligned with the channel, which makes them attractive from the perspective herein.

Thus, the beams in the BS and UE codebooks may be chosen as a DFT-like grid of beams, uniformly spread in the azimuth plane. This choice of beams is particularly suitable since, typically, any MIMO channel can be decomposed into a sum of DFT-like paths at certain (unknown) angles. Thus, by choosing this structure of the codebook beams at BS and UE to be the same as the structure of the paths that constitute the MIMO channel, it may be expected that some transmission and reception beams will be well aligned with some of the paths.

In the following, techniques will be exemplified for reducing the number of beams transmitted and/or received for training purposes, without substantial loss in performance of the selected beams.

In step 101 of method 100, a collection of linear combinations of transmission beams of the set of the available transmission beams is determined, as well as a collection of linear combinations of reception beams of the set of the available reception beams.

Typically, the collection of linear combinations of transmission beams and the collection of linear combinations of reception beams may be determined jointly. Joint determination may comprise determination in a joint operation; such that the determination of the collection of linear combinations of transmission beams depends on the collection of linear combinations of reception beams, and/or such that the determination of the collection of linear combinations of reception beams depends on the collection of linear combinations of transmission beams.

In some embodiments, one or more of the determinations of step 101 may be specified, e.g., in a standard. Alternatively or additionally, the one or more of the determinations of step 101 may be based on a sparsity of the channel as experienced at the transmitter apparatus and/or at the receiver apparatus (e.g., a sparsity of a channel between the transmitter apparatus and the receiver apparatus). Yet alternatively or additionally, the one or more of the determinations of step 101 may be based on properties of a compression matrix representing the collection of linear combinations of transmission beams and the collection of linear combinations of reception beams.

The cardinality of the collection of linear combinations of transmission beams may be equal to, or lower than, the cardinality of the set of the available transmission beams. Similarly, the cardinality of the collection of linear combinations of reception beams may be equal to, or lower than, the cardinality of the set of the available reception beams. The cardinalities of the collections are also larger than one.

Typically, at least one of the cardinality of the collection of linear combinations of transmission beams and the cardinality of the collection of linear combinations of reception beams is lower than the cardinality of the respective set of the available transmission/reception beams. In some embodiments, the cardinality of the collection of linear combinations of transmission beams is lower than the cardinality of the set of the available transmission beams, and the cardinality of the collection of linear combinations of reception beams is lower than the cardinality of the set of the available reception beams.

In some embodiments, one or more of the determinations of step 101 may comprise determining the cardinality of the collection of linear combinations of transmission and/or reception beams based on a sparsity of the channel as experienced at the transmitter apparatus and/or at the receiver apparatus (e.g., a sparsity of a channel between the transmitter apparatus and the receiver apparatus). Alternatively or additionally, one or more of the determinations of step 101 may comprise determining the cardinality of the collection of linear combinations of transmission and/or reception beams based on properties of a compression matrix representing the collection of linear combinations of transmission beams and the collection of linear combinations of reception beams.

At least one of the linear combinations of transmission beams may be a linear combination of at least two of the transmission beams of the set of the available transmission beams. Thus, the linear combination is not an identity function. Similarly, at least one of the linear combinations of reception beams may be a linear combination of at least two of the reception beams of the set of the available reception beams.

In typical embodiments, each of the linear combinations of transmission/reception beams is a unique linear combination.

Also typically, each of the linear combinations of transmission/reception beams is a linear combination of all of the beams of the corresponding set.

The collection of linear combinations of transmission/reception beams may, for example, be defined by an approximately optimal Grassmannian coding matrix. Thus, each of the collections of linear combinations of transmission/reception beams may be defined by an N×K matrix with columns equal to K vectors from a complex Grassmannian packing problem in N dimensions; each column corresponding to an approximately optimal Grassmannian frame.

According to some embodiments, the collection of linear combinations of transmission beams, representable by a matrix $B_{TX}$, and the collection of linear combinations of reception beams, representable by a matrix $B_{RX}$, are determined such that $A^H A$ is a substantially block diagonal matrix, wherein $A = B_{TX} \otimes B_{RX}$ and $\otimes$ represents the Kronecker product.

Generally, any other suitable coding matrices may be used to define the collections of linear combinations.

In step 101a of the method 100, an indication of the collection of linear combinations of reception beams is provided by the transmitter apparatus and, in step 151 of the method 150, the indication of the collection of linear combinations of reception beams is acquired by the receiver apparatus. The transferring of the indication of the collection of linear combinations of reception beams between transmitter apparatus and receiver apparatus is represented by signaling 191 in FIG. 1C.

In step 102 of the method 100, each of the linear combinations of transmission beams of the collection of linear combinations of transmission beams is transmitted for beam selection measurements by the receiver apparatus.

In typical embodiments, each of the linear combinations of transmission beams of the collection of linear combinations of transmission beams is transmitted in a respective transmission time resource, the respective time resources being different (from each other), i.e., one linear combination of beams is transmitted at a time.

Alternatively, each of the linear combinations of transmission beams of the collection of linear combinations of transmission beams may be transmitted in a respective transmission frequency resource, the respective frequency resources being different (from each other), i.e., one linear combination of beams is transmitted per frequency resource.

Yet alternatively, each of the linear combinations of transmission beams of the collection of linear combinations of transmission beams may be transmitted in a respective transmission time-frequency resource, the respective time-frequency resources being different (from each other), i.e., one linear combination of beams is transmitted per time-frequency resource. Thereby, several linear combinations of beams may be transmitted per time resource and/or several linear combinations of beams may be transmitted per frequency resource.

Transmission in respective time and/or frequency resources may be particularly suitable when the beam structure of the channel does not change significantly across the resources used (time, frequency, or both).

In step 152 of the method 150, a number of measurement signals for beam selection measurements are received from the transmitter apparatus. The number of measurement signals correspond to the collection of linear combinations of transmission beams of the set of available transmission beams (e.g., the transmitted linear combinations as effected by the channel). The reception of step 152 is performed using each of the linear combinations of reception beams of the collection of linear combinations of reception beams.

The transmission of the linear combinations of transmission beams of the collection of linear combinations of transmission beams and the reception of the measurement signals corresponding to that collection is represented by signaling 192 in FIG. 1C.

Beam selection measurements are performed, in step 153 of the method 150, on the number of measurement signals for selection of the transmission beam from the plurality of available transmission beams and for selection of the reception beam from the plurality of available reception beams (e.g., for selection of a transmission-reception beam pair). Such measurements may be according to any suitable approach.

For example, performing beam selection measurements may comprise determining a quality metric (e.g., signal strength, SNR, etc.) for each combination of a transmission beam of the set of available transmission beams and a reception beam of the set of available reception beams based on the beam selection measurements (e.g., for each transmission-reception beam pair) based on the beam selection measurements.

Alternatively or additionally, performing beam selection measurements may comprise subjecting the number of received measurement signals to matched filtering, or minimum mean square error (MMSE) processing, or maximum likelihood (ML) detection processing, based on the collection of linear combinations of transmission beams and the collection of linear combinations of reception beam.

Step 153 may also comprise selecting a reception beam from the plurality of available reception beams. The selection may comprise selecting the reception beam of the best transmission-reception beam pair.

Optionally, a transmission beam selection measurement report is transmitted by the receiver apparatus, in step 154 of the method 150, for selection of the transmission beam from the plurality of available transmission beams. The transmission beam selection measurement report may be received by the transmitter apparatus, in step 104 of the method 100.

The transmission beam selection measurement report may be indicative of at least part of the selection measurement results (e.g. the quality metric) of the transmission beam of the best transmission-reception beam pair. Alternatively or additionally, the transmission beam selection measurement report may be indicative of a preferred transmission beam, or beams, determined by the receiver apparatus based on the selection measurement results (e.g., by indicating an index of each preferred transmission beam).

The transmission beam selection measurement report is represented by signaling 194 in FIG. 1C.

In optional step 105, the transmitter apparatus selects the transmission beam (to be used for transmission to the receiver apparatus) from the plurality of available transmission beams in accordance with the received transmission beam selection measurement report. The selection may be performed using any suitable approach. For example, the selection may be based on selection measurement results according to some embodiments. In another example, the selection merely comprises accepting the preferred transmission beam indicated in the transmission beam selection measurement report.

Once selected, the transmission beam is used, in optional step 106 of the method 100, to transmit signals to the receiving apparatus, which signals are received by the receiving apparatus using the selected reception beam, in optional step 156 of the method 150.

The transmission and reception of signals using the selected transmission/reception beams is represented by signaling 196 in FIG. 1C.

Figure 2A:
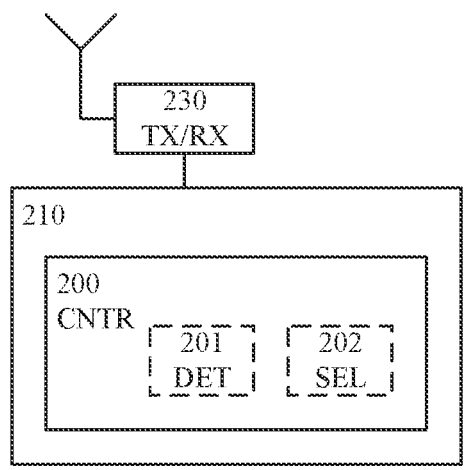
FIGS. 2A and 2B are schematic block diagrams illustrating example arrangements according to some embodiments.

FIG. 2A schematically illustrates an example transmitter apparatus 210 according to some embodiments. The transmitter apparatus is configured to transmit signals to a receiver apparatus using a transmission beam selected from a plurality of available transmission beams. The receiver apparatus is configured to receive the signals using a reception beam selected from a plurality of available reception beams. A set of the available transmission beams and a set of the available reception beams are for beam selection measurements by the receiver apparatus.

For example, the transmitter apparatus may be configured to perform (or cause performance of) one or more of the steps described in connection with the method 100 of FIG. 1A. The transmitter apparatus of FIG. 2A may be comprised in a network node and/or a wireless communication device, for example. The apparatus comprises controlling circuitry (CNTR; e.g. a controller or a controlling module) 200.

The controlling circuitry is configured to cause determination of a collection of linear combinations of transmission beams of the set of the available transmission beams and determination of a collection of linear combinations of reception beams of the set of available reception beams (compare with step 101 of FIG. 1A). To this end, the controlling circuitry may comprise, or be otherwise associated with (e.g., be operably connectable, or connected, to), determination circuitry (DET; e.g., a determiner or a determination module) 201. The determination circuitry may be configured to determine the collection of linear combinations of transmission beams of the set of the available transmission beams and the collection of linear combinations of reception beams of the set of available reception beams.

The controlling circuitry may also be configured to cause provision of an indication of the collection of linear combinations of reception beams to the receiver apparatus (compare with step 101a of FIG. 1A). To this end, the controlling circuitry may comprise, or be otherwise associated with (e.g., be operably connectable, or connected, to), provision circuitry (e.g., a provider or a provision module). In FIG. 2A, the provision circuitry is considered as comprised in the transceiving circuitry (TX/TR) 230. The provision circuitry may be configured to provide the indication of the collection of linear combinations of reception beams to the receiver apparatus.

The controlling circuitry may also be configured to cause transmission of each of the linear combinations of transmission beams of the collection of linear combinations of transmission beams for beam selection measurements by the receiver apparatus (compare with step 102 of FIG. 1A). To this end, the controlling circuitry may comprise, or be otherwise associated with (e.g., be operably connectable, or connected, to), transmission circuitry (e.g., a transmitter or a transmission module). In FIG. 2A, the transmission circuitry is considered as comprised in the transceiving circuitry (TX/TR) 230. The transmission circuitry may be configured to transmit each of the linear combinations of transmission beams of the collection of linear combinations of transmission beams for beam selection measurements by the receiver apparatus.

The controlling circuitry may also be configured to cause reception of a transmission beam selection measurement report from the receiver apparatus (compare with step 104 of FIG. 1A). To this end, the controlling circuitry may comprise, or be otherwise associated with (e.g., be operably connectable, or connected, to), reception circuitry (e.g., a receiver or a reception module). In FIG. 2A, the reception circuitry is considered as comprised in the transceiving circuitry (TX/TR) 230. The reception circuitry may be configured to receive the transmission beam selection measurement report from the receiver apparatus.

The controlling circuitry may also be configured to cause selection of the transmission beam from the plurality of available transmission beams in accordance with the received transmission beam selection measurement report (compare with step 105 of FIG. 1A). To this end, the controlling circuitry may comprise, or be otherwise associated with (e.g., be operably connectable, or connected, to), selection circuitry (SEL; e.g., a selector or a selection module) 202. The selection circuitry may be configured to select the transmission beam from the plurality of available transmission beams in accordance with the received transmission beam selection measurement report.

The controlling circuitry may also be configured to cause transmission of signals using the selected transmission beam (compare with step 106 of FIG. 1A). To this end, the controlling circuitry may comprise, or be otherwise associated with (e.g., be operably connectable, or connected, to), transmission circuitry (e.g., a transmitter or a transmission module). In FIG. 2A, the transmission circuitry is considered as comprised in the transceiving circuitry (TX/TR) 230. The transmission circuitry may be configured to transmit signals using the selected transmission beam.

Figure 2B:
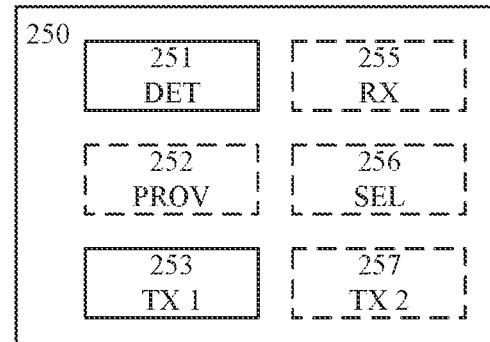

FIG. 2B schematically illustrates an example transmitter apparatus 250 according to some embodiments. The transmitter apparatus is configured to transmit signals to a receiver apparatus using a transmission beam selected from a plurality of available transmission beams. The receiver apparatus is configured to receive the signals using a reception beam selected from a plurality of available reception beams. A set of the available transmission beams and a set of the available reception beams are for beam selection measurements by the receiver apparatus.

For example, the transmitter apparatus may be configured to perform (or cause performance of) one or more of the steps described in connection with the method 100 of FIG. 1A. The transmitter apparatus of FIG. 2B may be comprised in a network node and/or a wireless communication device, for example.

The apparatus comprises a determiner (DET, e.g., a determination unit or determination module) 251 configured to determine a collection of linear combinations of transmission beams of the set of the available transmission beams and a collection of linear combinations of reception beams of the set of available reception beams (compare with step 101 of FIG. 1A).

The apparatus may also comprise a provider (PROV) 252 configured to provide an indication of the collection of linear combinations of reception beams to the receiver apparatus (compare with step 101a of FIG. 1A).

The apparatus also comprises a transmitter (TX 1) 253 configured to transmit each of the linear combinations of transmission beams of the collection of linear combinations of transmission beams for beam selection measurements by the receiver apparatus (compare with step 102 of FIG. 1A).

The apparatus may also comprise a receiver (RX) 255 configured to receive a transmission beam selection measurement report from the receiver apparatus (compare with step 104 of FIG. 1A).

The apparatus may also comprise a selector (SEL, e.g., a selection unit or selection module) 256 configured to select the transmission beam from the plurality of available transmission beams in accordance with the received transmission beam selection measurement report (compare with step 105 of FIG. 1A).

The apparatus may also comprises a transmitter (TX 2) 257—which may be the same as the transmitter 253— configured to transmit signals using the selected transmission beam (compare with step 106 of FIG. 1A).

Figure 3A:
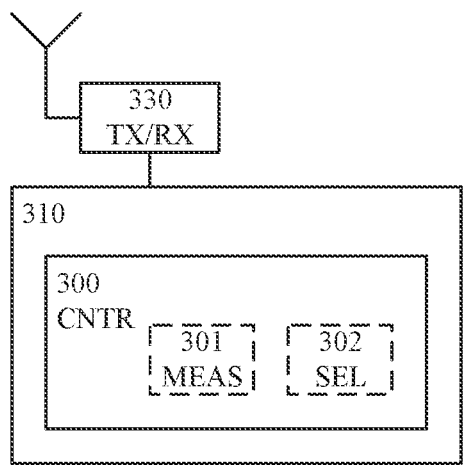
FIGS. 3A and 3B are schematic block diagrams illustrating example arrangements according to some embodiments.

FIG. 3A schematically illustrates an example receiver apparatus 310 according to some embodiments. The receiver apparatus is configured to receive, from a transmitter apparatus, signals using a reception beam selected from a plurality of available reception beams. The transmitter apparatus is configured to transmit the signals to the receiver apparatus using a transmission beam selected from a plurality of available transmission beams. A set of the available transmission beams and a set of the available reception beams are for beam selection measurements by the receiver apparatus.

For example, the receiver apparatus may be configured to perform (or cause performance of) one or more of the steps described in connection with the method 150 of FIG. 1B. The transmitter apparatus of FIG. 3A may be comprised in a network node and/or a wireless communication device, for example. The apparatus comprises controlling circuitry (CNTR; e.g. a controller or a controlling module) 300.

The controlling circuitry may be configured to cause acquisition, from the transmitter apparatus, of an indication of a collection of linear combinations of reception beams of the set of the available reception beams (compare with step 151 of FIG. 1B). To this end, the controlling circuitry may comprise, or be otherwise associated with (e.g., be operably connectable, or connected, to), acquisition circuitry (e.g., an acquirer or an acquisition module). In FIG. 3A, the acquisition circuitry is considered as comprised in the transceiving circuitry (TX/TR) 330. The acquisition circuitry may be configured to acquire, from the transmitter apparatus, an indication of a collection of linear combinations of reception beams of the set of the available reception beams.

The controlling circuitry is also configured to cause reception, using each of the linear combinations of reception beams of the collection of linear combinations of reception beams, of a number of measurement signals for beam selection measurements from the transmitter apparatus, wherein the number of measurement signals correspond to a collection of linear combinations of transmission beams of the set of available transmission beams (compare with step 152 of FIG. 1B). To this end, the controlling circuitry may comprise, or be otherwise associated with (e.g., be operably connectable, or connected, to), reception circuitry (e.g., a receiver or a reception module). In FIG. 3A, the reception circuitry is considered as comprised in the transceiving circuitry (TX/TR) 330. The reception circuitry may be configured to receive the measurement signals for beam selection measurements from the transmitter apparatus.

The controlling circuitry is also configured to cause performance of beam selection measurements on the measurement signals (compare with step 153 of FIG. 1B). To this end, the controlling circuitry may comprise, or be otherwise associated with (e.g., be operably connectable, or connected, to), measuring circuitry (MEAS e.g., a measurer or a measurement module) 301. The measuring circuitry may be configured to perform the beam selection measurements.

The controlling circuitry may also be configured to cause selection of a reception beam from the plurality of available reception beams. To this end, the controlling circuitry may comprise, or be otherwise associated with (e.g., be operably connectable, or connected, to), selection circuitry (SEL e.g., a selector or a selection module) 302. The selection circuitry may be configured to select the reception beam from the plurality of available reception beams.

The controlling circuitry may also be configured to cause transmission of a transmission beam selection measurement report to the transmitter apparatus for selection of the transmission beam from the plurality of available transmission beams (compare with step 154 of FIG. 1B). To this end, the controlling circuitry may comprise, or be otherwise associated with (e.g., be operably connectable, or connected, to), transmission circuitry (e.g., a transmitter or a transmission module). In FIG. 3A, the transmission circuitry is considered as comprised in the transceiving circuitry (TX/TR) 330. The transmission circuitry may be configured to transmit the transmission beam selection measurement report.

The controlling circuitry may also be configured to cause reception of signals using the selected reception beam (compare with step 156 of FIG. 1B). To this end, the controlling circuitry may comprise, or be otherwise associated with (e.g., be operably connectable, or connected, to), reception circuitry (e.g., a receiver or a reception module). In FIG. 3A, the reception circuitry is considered as comprised in the transceiving circuitry (TX/TR) 330. The reception circuitry may be configured to receive signals using the selected reception beam.

Figure 3B:
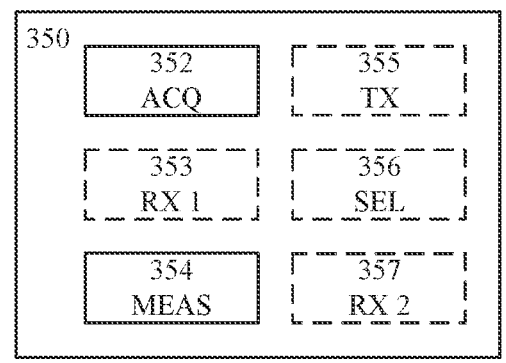

FIG. 3B schematically illustrates an example receiver apparatus 350 according to some embodiments. The receiver apparatus is configured to receive, from a transmitter apparatus, signals using a reception beam selected from a plurality of available reception beams. The transmitter apparatus is configured to transmit the signals to the receiver apparatus using a transmission beam selected from a plurality of available transmission beams. A set of the available transmission beams and a set of the available reception beams are for beam selection measurements by the receiver apparatus.

For example, the receiver apparatus may be configured to perform (or cause performance of) one or more of the steps described in connection with the method 150 of FIG. 1B. The transmitter apparatus of FIG. 3B may be comprised in a network node and/or a wireless communication device, for example.

The apparatus comprises an acquirer (ACQ; e.g., an acquisition unit or acquisition module) 352 configured to acquire, from the transmitter apparatus, an indication of a collection of linear combinations of reception beams of the set of the available reception beams (compare with step 151 of FIG. 1B).

The apparatus may also comprise a receiver (RX 1) 353 configured to receive, using each of the linear combinations of reception beams of the collection of linear combinations of reception beams, a number of measurement signals for beam selection measurements from the transmitter apparatus, wherein the number of measurement signals correspond to a collection of linear combinations of transmission beams of the set of available transmission beams (compare with step 152 of FIG. 1B).

The apparatus also comprises a measurer (MEAS; e.g., a measurement unit or measurement module) 354 configured to perform beam selection measurements on the measurement signals (compare with step 153 of FIG. 1B).

The apparatus may also comprise a selector (SEL; e.g., a selection unit or selection module) 356 configured to select a reception beam from the plurality of available reception beams.

The apparatus may also comprise a transmitter (TX) 355 configured to transmit a transmission beam selection measurement report to the transmitter apparatus for selection of the transmission beam from the plurality of available transmission beams (compare with step 154 of FIG. 1B).

The apparatus may also comprise a receiver (RX 2) 357—which may be the same as the receiver 353—configured to receive signals using the selected reception beam (compare with step 156 of FIG. 1B).

Thus, according to some embodiments, beam compression (also denoted herein as beam coding) for reducing overhead of beam training is provided. The compression may be applicable at the transmitter apparatus and/or at the receiver apparatus.

Coding of the original beams (the beams of the set(s)) is formulated such that the number of coded beams at the transmitter apparatus and/or at the receiver apparatus are (preferably significantly) less than the number of original beams. The coded beams correspond to the linear combinations of beams. When the transmitter apparatus (e.g., a BS) transmits the coded transmission beams and the receiver apparatus (e.g., a UE) receives using the coded reception beams, the total time for beam training becomes significantly lower than when the original set(s) of beams are used.

The receiver apparatus may (in typical approaches) perform a simple operation (matched filtering (corresponding to a maximum likelihood solution), MMSE processing, or similar) to estimate which pair of the original beams is best, and the index of the preferred original transmission beam may be fed back to the transmitter apparatus.

Thus, some embodiments aim at reducing the overhead of the beam sweeping procedure. This may be achieved using adapted BS and UE beam sweeping codebooks (reduced in size compared to the original, conventional, beam sweeping codebooks), which comprise linear combinations of the beams as defined in the original codebooks.

If the matrix $F_{BS}$ denotes the beam sweeping codebook at the BS (wherein the columns of $F_{BS}$ are transmission beams) and $F_{UE}$ denotes the beam sweeping codebook at the UE (wherein the columns of $F_{UE}$ are reception beams) some embodiments may comprise—instead of the BS transmitting each beam (column) of $F_{BS}$, one slot at a time, and the UE listening on each beam (column) of $F_{UE}$, one slot at a time—creating new sets of beams at the BS and/or at the UE.

The new sets of beams may be represented by the matrices $G_{BS}$ and $G_{UE}$, respectively, and may be defined by the following linear transformations $G_{BS}=F_{BS}B_{BS}^T$, $G_{UE}=F_{UE}B_{UE}^T$, where $(.)^T$ denotes matrix transpose. These new matrices (codebooks) may replace the original ones, $F_{BS}$ and $F_{UE}$, at least during the training phase for beam selection.

These beams represented by the $G_{BS}$ and $G_{UE}$ are coded beams (respective collections of linear combinations), and $B_{BS}$ and $B_{UE}$ act as a codes on the original sets of beams in $F_{BS}$ and $F_{UE}$, respectively. In each transmission resource (e.g., time and/or frequency), a linear combination of the transmission beams in $F_{BS}$ is transmitted, and received using a linear combination of the reception beams in $F_{UE}$. If $B_{BS}$ has no zero-valued elements, all transmission beams of $F_{BS}$ are transmitted in each transmission resource.

If $L_{BS}$ denotes the number of rows in $B_{BS}$ and $L_{UE}$ denotes the number of rows in $B_{UE}$ (which equal the number of columns in $G_{BS}$ and $G_{UE}$, respectively), the number of transmission resources (e.g., in time and/or frequency) needed for beam sweeping is $L_{BS}L_{UE}$.

When $B_{BS}$ and $B_{UE}$ are constructed such that $L_{BS}L_{UE}$ is (substantially) smaller than $N_{BS}N_{UE}$—where $N_{BS}$ denotes the number of transmission beams (columns) in $F_{BS}$ and $N_{UE}$ denotes the number of reception beams (columns) in $F_{UE}$—beam sweeping becomes more resource efficient.

Hence, a significant reduction of training overhead for beam sweeping may be achieved according to some embodiments. Possibly, this approach entails an increase in error probability for detection of the best combination of transmission-reception beams. However, proper construction of the coding matrices $B_{BS}$ and $B_{UE}$ can make this error probability small.

One possible approach for the construction of the coding matrices $B_{BS}$ and $B_{UE}$ is to let them be Grassmannian frames/matrices; e.g., selecting the columns in $B_{BS}$ as vectors from a complex Grassmannian packing problem in $N_{BS}$ dimensions, and selecting the columns in $B_{UE}$ as vectors from a complex Grassmannian packing problem in $N_{UE}$ dimensions.

Furthermore, the detector at the reception apparatus may be very simple. For example, the detector may be implemented as a matched filter that is matched to the coding matrices in some embodiments.

According to some embodiments, it is assumed that the BS is aware of the number of antennas at the UE and the beam codebook size at the UE. Such information may, for example, be signaled by the UE to the BS at some suitable point in time (e.g., in connection with association/registration). Then, for a codebook size of $N_{BS}$ at BS and $N_{UE}$ at UE, the BS may determine Grassmannian matrices for the BS and the UE that result in a codebook of $L_{BS}$ beams at BS and $L_{UE}$ beams at UE. The BS informs the UE about which matrix the UE should choose (provides an indication of the collection of linear combinations of reception beams to the receiver apparatus). The BS may also inform the UE about which matrix is chosen at the BS. Then, the BS transmits the transmission beams that result from compression with the BS Grassmannian matrix and the UE projects the received signal onto the reception beams that result from compression with the UE Grassmannian matrix. The UE determines the indices of the best transmission-reception beam pair and feeds back the index of the best transmission beam to the BS.

An example will now be provided to illustrate the general descriptions of FIGS. 1A-C, 2A-B and 3A-B. In this example, it is assumed that the BS has $M_{BS}$ antennas and the UE has $M_{UE}$ antennas.

A BS codebook $F_{BS}=[f_{BS,1}, \ldots, f_{BS,K}]$ and a UE codebook $F_{UE}=[f_{UE,1}, \ldots, f_{UE,K}]$ are considered for beam sweeping. The columns of these matrices are the beams for beam selection training (the sets of beams in the wording above). As described above, these beams may be DFT beams, where each element has a constant magnitude.

A goal of the training procedure may, for example, be know which pair of the beams (one beam from the set $f_{BS,1}, \ldots, f_{BS,K}$ and one beam from the set $f_{UE,1}, \ldots, f_{UE,K}$) provides highest received SNR at the UE; typically for the BS to know which beam in $F_{BS}$ it should use when transmitting to the UE and for the UE to know which beam in $F_{UE}$ it should use when receiving data from the BS.

This may be achieved, for example, by determining (at the UE) which of the $N_{BS}N_{UE}$ values $|F_{UE}^H(:,i)HF_{BS}(:,j)|$, $1 \le i \le N_{UE}$, $1 \le j \le N_{BS}$, is largest, where H denotes the downlink (DL) channel matrix and $(.)^H$ denotes Hermitian transpose. The value $|F_{UE}^H(:,i)HF_{BS}(:,j)|$ represents the effective channel gain (which is proportional to the SNR) when using beam i and beam j at the UE and BS, respectively.

When the UE has determined the largest combination, say $(i_l, j_l)$, it may report the index $j_l$ to the BS (in a selection measurement report; e.g., in a subsequent feedback phase) and receive a subsequent data transmission on the reception beam $F_{UE}(i_l,:)$. Hence, index $i_l$ does not necessarily need to be reported to the BS.

A straightforward way to determine the largest $|F_{UE}^H(:,i)HF_{BS}(:,j)|$ is to let the BS transmit the beams in its codebook $F_{BS}$, one transmission beam at a time, and the UE to receive the incoming BS beams on each of the beams in its codebook $F_{UE}$, one reception beam at a time as mentioned above, which results in $N_{BS}N_{UE}$ transmissions from the BS to the UE.

As mentioned above, an approach to reducing the usage of communication resources comprises—instead of transmitting and receiving across the original beam codebooks $F_{BS}$ and $F_{UE}$—using linear combinations of the beams of the original beam codebooks. Such linear combinations may be achieved by linear encoding (performed by the BS and/or the UE) and may result in new beam codebooks:

$$G_{BS}=F_{BS}B_{BS}^T$$

$$G_{UE}=F_{UE}B_{UE}^H.$$

The matrices $B_{BS}^T$ and $B_{UE}^H$ are linear encoding matrices that can be designed as suitable. They transform the original beam sets $F_{BS}$ and $F_{UE}$ into the reduced beam sets $G_{BS}$ and $G_{UE}$ (the collections of linear combinations of transmission/reception beams).

Design of the matrices $B_{BS}^T$ and $B_{UE}^H$ entails design of a matrix $A=B_{BS} \otimes B_{UE}$ (where $\otimes$ stands for the matrix Kronecker product), and vice versa. As before, $(.)^T$ denotes matrix transpose and $(.)^H$ denotes Hermitian transpose, and this selection of transpositions results in the particular expression for A as will be exemplified later herein. Other embodiments, may use $G_{BS}=F_{BS}B_{BS}^H$ and $G_{UE}=F_{UE}B_{UE}^T$, $G_{BS}=F_{BS}B_{BS}^H$ and $G_{UE}=F_{UE}B_{UE}^H$, or $G_{BS}=F_{BS}B_{BS}^T$ and $G_{UE}=F_{UE}B_{UE}^T$; and result in other expressions for A. Preferably, A should be designed to be suitable for the detection problem as specified below.

Thus, $G_{BS}$ and $G_{UE}$ may be used as new beam codebooks; the BS may transmit the columns from $G_{BS}$ and the UE may receive on the columns of $G_{UE}$. If $L_{BS}$ denotes the number of columns in $G_{BS}$ and $L_{UE}$ denotes the number of columns in $G_{UE}$, the total training overhead when $G_{BS}$ and $G_{UE}$ are used for training will be $L_{BS}L_{UE}$.

Since the new beams of each of $G_{BS}$ and $G_{UE}$ are linear combinations of the original beams of each of $F_{BS}$ and $F_{UE}$, respectively, the new beams carry information about the original beams. According to some embodiments, it may be beneficial to have as few columns in $G_{BS}$ and $G_{UE}$ as possible (or to find $G_{BS}$ and $G_{UE}$ such that $L_{BS}L_{UE} \ll N_{BS}N_{UE}$; e.g., to minimize the product of the number of columns in $G_{BS}$ and $G_{UE}$). Preferably, this should be achieved without sacrificing too much in performance of the determination of the largest $|F_{UE}^H(:,i)HF_{BS}(:,j)|$.

The reduced codebooks $G_{BS}$ and $G_{UE}$ may be used only during the training phase, in order to learn the largest combination $|F_{UE}^H(:,i)HF_{BS}(:,j)|$. Then, they do not completely replace the original beam codebooks $F_{BS}$ and $F_{UE}$, which may be used in the subsequent data transmission. Alternatively, the reduced codebooks $G_{BS}$ and $G_{UE}$ may be used during the training phase and for subsequent data transmission, or only for subsequent data transmission.

If $y_{m,n}=G_{UE}(:,m)^H H G_{BS}(:,n)+n_{m,n}$, $1 \le m \le L_{UE}$, $1 \le n \le L_{BS}$, denotes the received sample at the UE when the UE receives on beam $G_{UE}(:,m)$ and BS transmits beams $G_{BS}(:,n)$, the resulting system model may be expressed as $$y=(B_{BS} \otimes B_{UE})c+n=Ac+n,$$

where $y=[y_{1,1} \; y_{2,1} \; \ldots \; y_{L_{UE},L_{BS}}]^T$ denotes the received samples corresponding to all transmission-receiver beam pairs stacked in a column vector, $n=[n_{1,1} \; n_{2,1} \; \ldots \; n_{L_{UE},L_{BS}}]^T$ denotes the corresponding additive white Gaussian noise (AWGN) samples $n_{m,n}$ stacked in a column vector, H denotes the downlink channel matrix (e.g., for a MIMO channel; a MIMO channel on a certain subcarrier in case of an OFDM system), and $c=\text{vec}(F_{UE}^H H F_{BS})$.

The notation $\text{vec}(F_{UE}^H H F_{BS})$ may be understood as the columns of $F_{UE}^H H F_{BS}$ stacked on top of each other. Thus, if A is an N×M matrix where the $i^{th}$ column is denoted $a_i$, then $\text{vec}(A)$ is an MN×1 vector; $\text{vec}(A)=[a_1^T \ldots a_M^T]^T$. Using this model expression, the detection problem (determining the largest $|F_{UE}^H(:,i)HF_{BS}(:,j)|$) translates to finding the index of the element in c with highest magnitude. Therefrom, the preferred pair of transmission-reception beams can be determined.

At first glance, it might appear that the detection problem is ill conditioned since A is a $L_{BS}L_{UE} \times N_{BS}N_{UE}$ matrix that has more columns than rows. However, under certain statistical assumptions for c and a certain structure of A (both of which will be exemplified below), a simple matched filter (matched to the matrix A) followed by locating the element with largest magnitude performs very well.

Thus, one possible decoder for the index $\hat{k}$ of the element in c with largest magnitude is obtained as $$\hat{k} = \arg\max_k |(A^H y)_k|,$$

where $(A^H y)_k$ is the k:th element in the vector $A^H y$.

From the index $\hat{k}$, the index of the preferred reception beam can be determined as $\mathrm{mod}(\hat{k}-1, M_{UE})+1$, where mod (a,b) is the rest when a is divided by b, and the index of the preferred transmission beam can be determined as $\lceil \hat{k}/M_{UE}\rceil$, where $\lceil . \rceil$ is the ceiling operator.

It is possible to compress the original codebooks into smaller ones as elaborated on above, while still obtaining small error probability in the detection (determination) of the "best" combination of beams from the original codebooks (e.g., the transmission-reception beam pair having the largest value of $|F_{UE}^H(:,i)HF_{BS}(:,j)|$) with the simple matched filter receiver. As mentioned above, this is possible under certain statistical assumptions for c and a certain structure of A.

An example of such a certain structure of A is when $A=B_{BS}\otimes B_{UE}$ has unitary-like properties, and an example of such certain statistical assumptions for c is when the vector c is sparse. Examples of unitary-like properties include a diagonal dominant structure and/or a low spread of non-zero eigenvalues.

A matrix with low spread of non-zero eigenvalues may, for example, be defined as a matrix where the ratio between the magnitude of the non-zero eigenvalue having the largest magnitude and the magnitude of the non-zero eigenvalue having the smallest magnitude is less than a certain percentage (e.g. 20%, 10%, 5%, 1%, 0.1%, 0.01%) of the number of non-zero eigenvalues.

A sparse vector may, for example be defined as a vector where more than a threshold, e.g., a certain percentage (e.g., 80%, 90%, 95% or 99%), but less than all, of the elements equal zero.

A diagonal dominant structure of a matrix may, for example be defined as a matrix where all elements, which are offset to the diagonal with more than a threshold, e.g., a certain percentage (e.g., 1%, 2%, 3%, 5%, 10%, or 20%) of the number of rows (or columns) of the matrix, equal zero (or has a magnitude that is less than a threshold, e.g., a certain percentage (e.g., 1%, 2%, 3%, 5%, 10%, or 20%) of the largest magnitude of the matrix elements).

Alternatively, a diagonally dominant matrix may be defined as a matrix where the ratio between the sum of the magnitudes of the diagonal elements and the sum of the magnitudes of the non-diagonal elements is smaller than a threshold value (e.g. 1, 0.5, 0.1, 0.01); regardless of whether or not there are zero-valued off-diagonal elements.

One way of achieving that A has unitary-like properties is to let the coding matrices $B_{BS}$ and $B_{UE}$ be Grassmannian frames/matrices. Such a choice results in that the Gram of A (i.e., $A^H A$) has properties that—for detection purposes—resemble the properties of an identity matrix. Typically, less compression leads to better resemblance. Examples of such properties include that $A^H A$ has a diagonal dominant structure, and that the spread between the non-zero eigenvalues of $A^H A$ is low.

Sparsity of the vector c depends on the properties of the downlink channel matrix H. Sparsity exists, e.g., in relation to mmW (millimetre wavelength) channels. Sparsity of the vector c may be beneficial for the detection since the non-zero elements in c (other than the element with largest magnitude) act as interference for the detector. Thus, sparsity of c entails low interference for the detection, which typically is important for good detection performance. Sparsity of c may also entail that a structure of A having more columns than rows does not result in an ill-posed detection problem. This is because, during detection, only a few columns of A—those corresponding to a non-zero elements in c—are activated at a time when c is sparse.

Under these assumptions, a matched filter detector performs almost as good as a detector based on maximum likelihood (ML) decoding.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a network node.

Embodiments may appear within an electronic apparatus (such as a wireless communication device or a network node) comprising arrangements, circuitry, and/or logic according to any of the embodiments described herein. Alternatively or additionally, an electronic apparatus (such as a wireless communication device or a network node) may be configured to perform methods according to any of the embodiments described herein.

Figure 4:
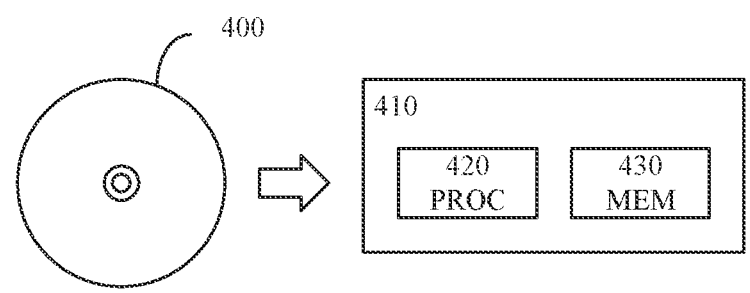
FIG. 4 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 4 illustrates an example computer readable medium in the form of a compact disc (CD) ROM 400. The computer readable medium has stored thereon a computer program comprising program instructions. The computer program is loadable into a data processor (PROC) 420, which may, for example, be comprised in a wireless communication device or a network node 410. When loaded into the data processing unit, the computer program may be stored in a memory (MEM) 430 associated with or comprised in the data-processing unit. According to some embodiments, the computer program may, when loaded into and run by the data processing unit, cause execution of method steps according to, for example, any of the methods illustrated in FIGS. 1A and 1B, or otherwise described herein.

Figure 5A:
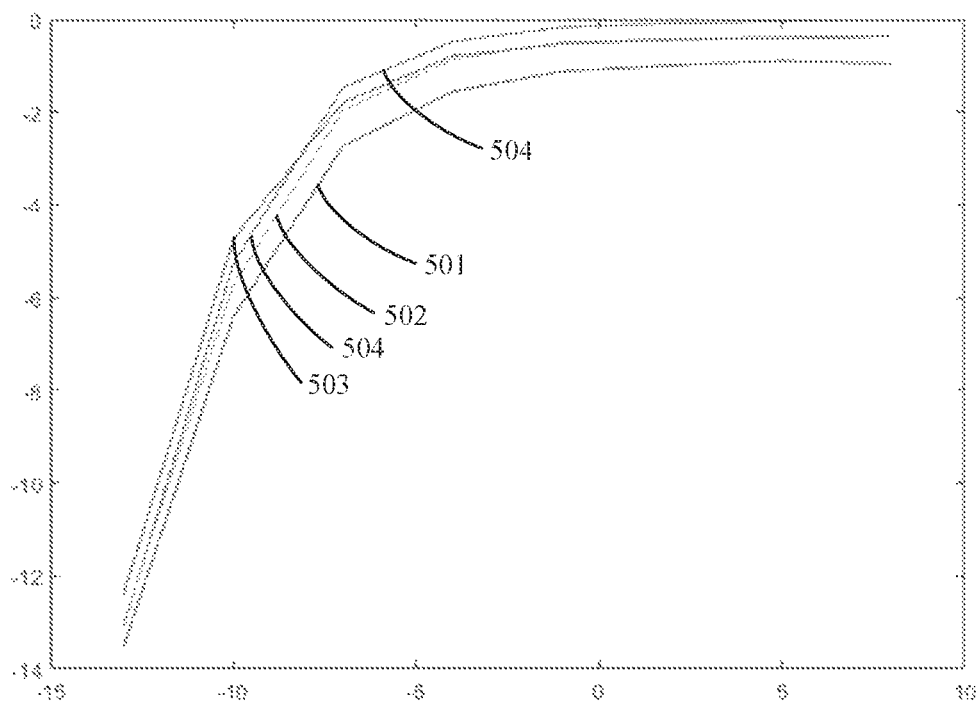
FIGS. 5A and 5B are simulation plots illustrating example results obtainable by application of some embodiments.
Figure 5B:
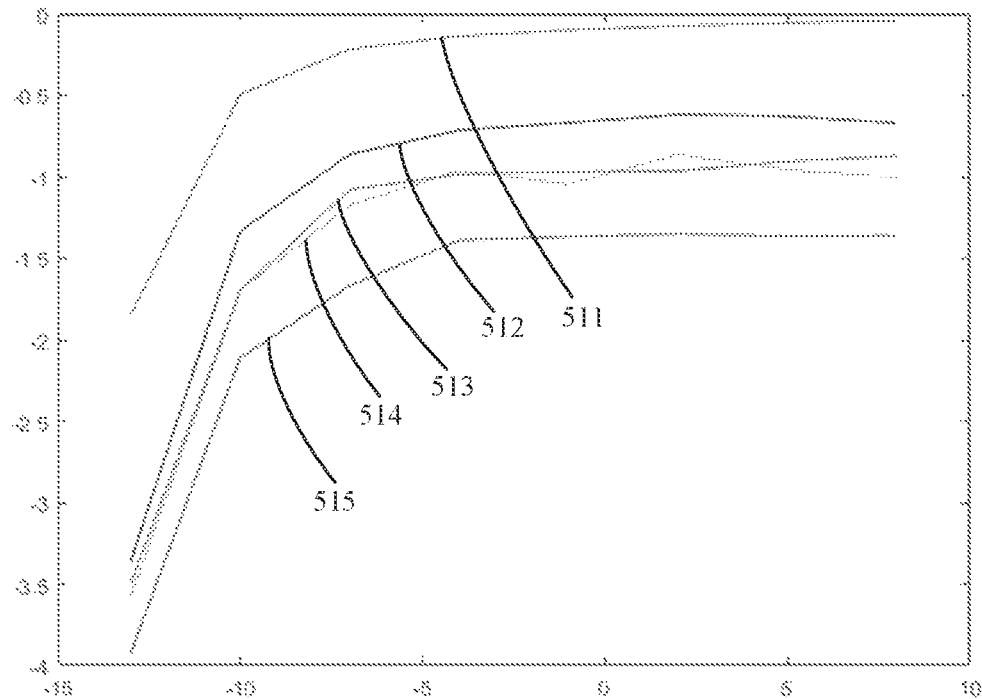

FIGS. 5A and 5B are simulation plots illustrating example results obtainable by application of some beam sweeping compression embodiments. In these simulations, it was assumed that the downlink $M_{UE}\times M_{BS}$ MIMO channel H represents a narrowband MIMO channel (e.g. a MIMO channel on an OFDM subcarrier), which can be expressed as $$H = \sum_{i=1}^{L} a_i e_{UE}(\theta_i) e_{BS}(\phi_i)^T,$$

where $a_i$ are complex Gaussian scalars with unit variance, L denotes the number of simultaneously received reflections, $e_{UE}(\theta)=[1 \ e^{i\pi\ sin(\theta)}\ \ldots\ e^{i\pi(M_{UE}-1)sin(\theta)}]^T$, and $e_{BS}(\phi)=[1\ e^{i\pi\ sin(\phi)}\ \ldots\ e^{i\pi(M_{BS}-1)sin(\phi)}]^T$. In a mmW scenario, L is small (typically L≤10). In an outdoor scenario with dominant line-of-sight (LOS) and ground reflection, L=2.

The simulation results illustrated in FIGS. 5A and 5B represent two different types of codebook constructions for $F_{BS}$ and $F_{UE}$. In the first construction (FIG. 5a), the beam vectors in $F_{BS}$ and $F_{UE}$ are uniformly spread analog beams in the azimuth direction; which is the typical codebook used for a mmW channel. The second construction (FIG. 5B) is a more narrow codebook, where the beams in $F_{BS}$ and $F_{UE}$ are concentrated around a certain direction; which is typical for beam tracking where the codebooks are adjusted to be concentrated around the last found best beam combination. The second construction results in a less sparse vector c than the first construction, which will entail worse detection performance; especially when the compression is as large.

FIG. 5A shows the beam selection performance (loss in dB with regard to optimal beam—20 $\log(|F_{UE}^H(:,i^*)HF_{BS}(:,j^*)|)-20 \log(|F_{UE}^H(:,\hat{i})HF_{BS}(:,\hat{j})|)$, where $\hat{i}$ and $\hat{j}$ are the estimates of the indexes of the optimal beam pair i* and j*—versus SNR in dB) in the case of a uniformly spread codebook, where L=4 paths are assumed in the MIMO channel, the BS has 64 antennas (and as many beams in the original codebook) and the UE has 16 antennas (and as many beams in the original codebook).

The curve 504 (uppermost at high SNR) represents the case when there is no compression at either of the BS and UE, i.e., the BS transmits each beam from $F_{BS}$ separately, and the UE listens on each beam from $F_{UE}$ separately. It is expected that this curve will in general have the best performance (it saturates at roughly 0 dB loss compared to the optimal beam, i.e., it manages to report the optimal beam at high enough SNRs). This case requires 16×64=1024 transmission resources.

The curves 501, 502, 503 represent different levels of compression. The curve 501 represent using 8 linear combinations of beams at the UE and 40 linear combinations of beams at the BS. The curve 502 represent using 10 linear combinations of beams at the UE and 32 linear combinations of beams at the BS. The curve 503 represent using 10 linear combinations of beams at the UE and 40 linear combinations of beams at the BS.

As seen from FIG. 5A, a compression of the BS codebook to 32 beams and of the UE codebook to 10 beams (refer to curve 502) results in only a marginal loss (saturating at a loss of 0.37 dB) compared to the case with no compression; across all ranges of SNR. This case requires 10×32=320 transmission resources; a saving of $$\frac{1024-320}{1024} \approx 69\%$$

compared to the case with no compression.

Another interesting observation from FIG. 5A is that the curve 501 has significantly worse performance than the curve 502, although they require the same number of transmission resources. This indicates that it may be important how the compression is distributed between the transmitter apparatus and the receiver apparatus. Typically, if the compression is too large at any side, the performance will start to degrade.

FIG. 5B shows the beam selection performance (loss in dB with regard to optimal beam versus SNR in dB) in the case where the codebooks at the BS and the UE are adapted to the strongest path in the channel; a beam tracking scenario. As for FIG. 5A, L=4 paths are assumed in the MIMO channel, the BS has 64 antennas (and as many beams in the original codebook) and the UE has 16 antennas (and as many beams in the original codebook).

The strongest path is the term in $H=\Sigma_{i=1}^{L} a_i e_{UE}(\theta_i) e_{BS}(\phi_i)^T$ with largest value of $|a_i|$. If $\theta$ is the UE angle of the strongest path and $\phi$ is the BS angle of the strongest path in, then the UE codebook consists of beams with angles uniformly spread in $$[\theta - \frac{\pi}{4}, \theta + \frac{\pi}{4}]$$

and the BS codebook consists of beams with angles uniformly spread in $$[\phi - \frac{\pi}{4}, \phi + \frac{\pi}{4}].$$

The curve 511 (uppermost) represents the case when there is no compression at either of the BS and UE, i.e., the BS transmits each beam from $F_{BS}$ separately, and the UE listens on each beam from $F_{UE}$ separately. It is expected that this curve will in general have the best performance. This case requires 16×64=1024 transmission resources.

The curves 512, 513, 514, 515 represent different levels of compression. The curve 512 represent using 10 linear combinations of beams at the UE and 48 linear combinations of beams at the BS. The curve 513 represent using 10 linear combinations of beams at the UE and 40 linear combinations of beams at the BS. The curve 514 represent using 10 linear combinations of beams at the UE and 32 linear combinations of beams at the BS. The curve 515 represent using 8 linear combinations of beams at the UE and 40 linear combinations of beams at the BS.

Comparing FIG. 5B with FIG. 5A, it may be seen that the compression now causes a more prominent loss compared to the approach with no compression. The reason is that the vector c is not as sparse in FIG. 5B as in FIG. 5A. Therefore, the performance of the matched filter estimation will suffer from strong interference. Hence, sparsity of c may be important to not loose in detection performance for substantial compression.

Nevertheless, the performance may still be acceptable. Reducing the beam sweeping overhead—the required number of transmission resources—with more than 50% compared to no compression (going from 64×16=1024 for curve 511 to 10×48=480 for curve 512) results in a loss of 0.6 dB.

Similarly to in FIG. 5A it may be noted in FIG. 5B that the curve 515 has significantly worse performance than the curve 514, although they require the same number of transmission resources, which indicates that it may be important how the compression is distributed between the transmitter apparatus and the receiver apparatus.

Since it may be important how the compression is distributed between the transmitter apparatus and the receiver apparatus, joint determination of the collection of linear combinations of transmission beams and the collection of linear combinations of reception beams may be beneficial. Various aspects of such joint determination will now be exemplified.

Of course, the approaches of joint determination may be restricted by what information is available. Furthermore, constrains (e.g., complexity, delay, etc.) in the transmitter and/or receiver implementation may provide conditions for the joint determination.

In a first example of joint determination, the determination is made solely based on the structure of the matrix $A=B_{BS} \otimes B_{UE}$. This example may be applicable, for example, when there is no available information about the propagation channel. In this example, the diagonal elements of $A^H A$ act as the desirable signal and the off-diagonal elements of $A^H A$ act as interference. The signal-to-interference ratio (i.e., the sum of the energy of all diagonal elements divided by the sum of the energy of the all off-diagonal elements) may be used as a determination metric, and $B_{BS}$ and $B_{UE}$ may be selected to maximize this metric for a given amount of compression. For example, if there are 10 candidate beams at the BS as well as at the UE (i.e., 100 beam pair candidates) and an overall compression factor of 50% is desired, then possible compression distributions include $B_{BS}$ and $B_{UE}$ having 7 columns each, $B_{BS}$ having 8 columns and $B_{UE}$ having 6 columns, etc. Then, the compression distribution is chosen that entails the largest signal-to-interference ratio as defined above.

In a second example of joint determination, knowledge is available (e.g., from channel estimations) regarding how many transmission and reception propagation paths are present in the downlink channel (i.e., how sparse the channel is seen from the transmitter apparatus and from the receiver apparatus). Then, even if an overall compression factor of 50% is desired and if there are 10 candidate beams at the BS as well as at the UE (i.e., 100 beam pair candidates), a compression distribution where $B_{BS}$ and $B_{UE}$ have 7 columns each would not perform well if, for example, 7 transmission paths and 2 reception paths are present. In this example, a suitable determination metric may be similarity between transmitter side and receiver side of respective ratio of the number of beams and the number of paths present. When 7 transmission paths and 2 reception paths are present a good compression distribution may be $B_{BS}$ having 10 columns (i.e., no compression) and $B_{UE}$ having 5 columns since then the ratios ($10/7 \approx 1.4$ and $5/2=2.5$) become as similar as possible. If there were more beams available at the BS, a better compression distribution may be $B_{BS}$ having 12 columns (i.e., no compression) and $B_{UE}$ having 4 columns since then the ratios ($12/7 \approx 1.7$ and $4/2=2$) become even more similar.

One way of acquiring knowledge of the number of paths present may be via application of subspace estimation via singular value decomposition (SVD). In such an approach, a starting point may be knowledge regarding all the received signals from the latest beam sweeping procedure and/or the received signals from online channel measurements using reference signals. Using an assumption that the current number of paths is the same, or very similar, to the number of paths present at the time of the latest beam sweep and/or channel measurements, the spatial covariance matrix can be estimated for the BS and for the UE. The number of dominant singular values, after singular value decomposition, of each these covariance matrices may constitute an estimate of the number of present paths at the BS and at the UE, respectively.

In a third example, a hybrid between the first example (matrix signal-to-interference ratio detection) and the second example (similarity of beam-path ratios) is applied. For example, if the first example indicates that $B_{BS}$ and $B_{UE}$ should have 7 columns each and the second example indicates that $B_{BS}$ should have 10 columns and $B_{UE}$ should have 5 columns, an intermediary solution where $B_{BS}$ has 8 columns and $B_{UE}$ has 6 columns may be applicable according to this example.

Figure 6:
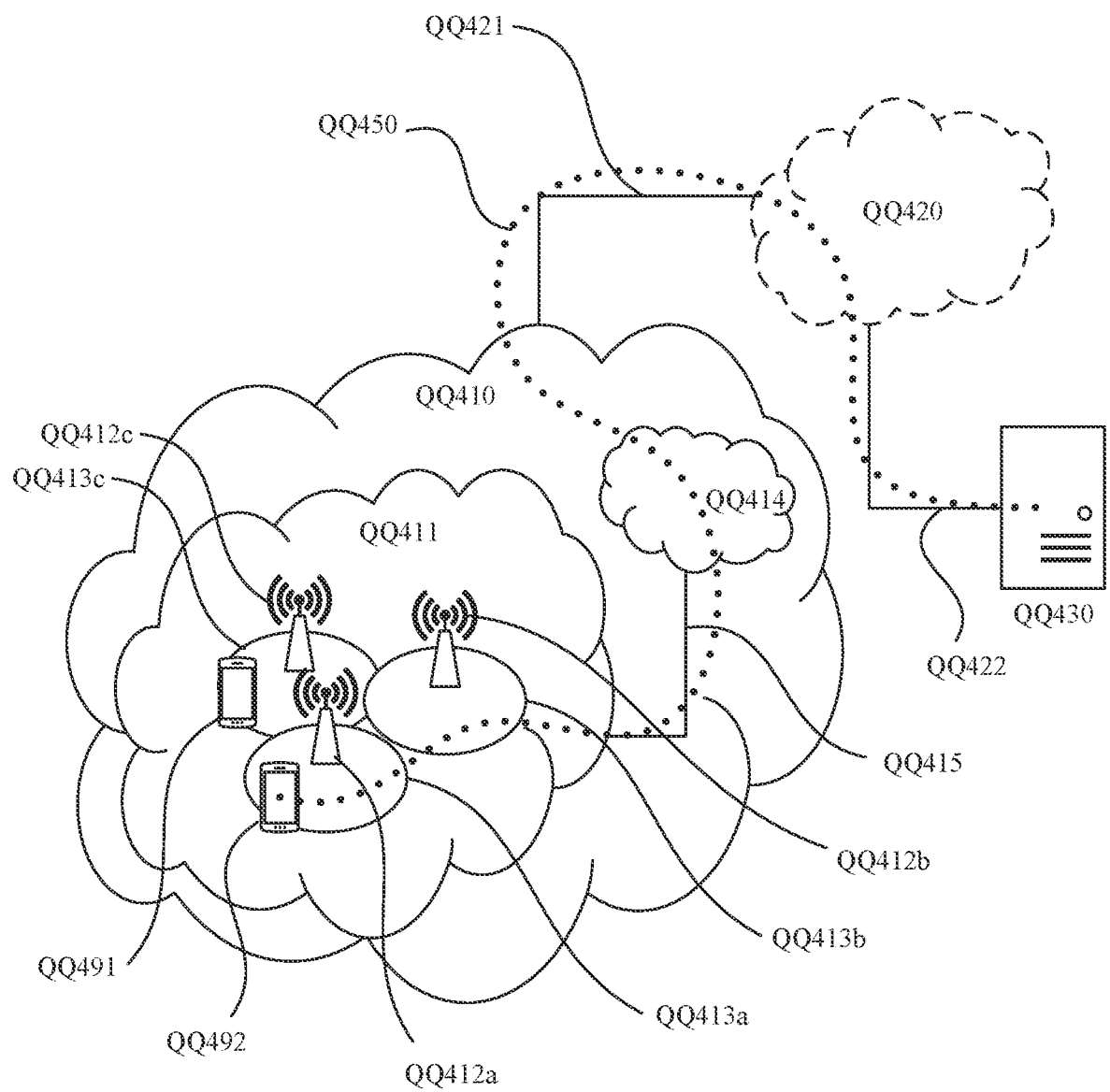
FIG. 6 illustrates a telecommunication network connected via an intermediate network to a host computer in accordance with some embodiments.

With reference to FIG. 6, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 6 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 7. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 7) served by base station QQ520. Communication interface QQ526 may be configured to facilitate connection QQ560 to host computer QQ510. Connection QQ560 may be direct or it may pass through a core network (not shown in FIG. 7) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 7:
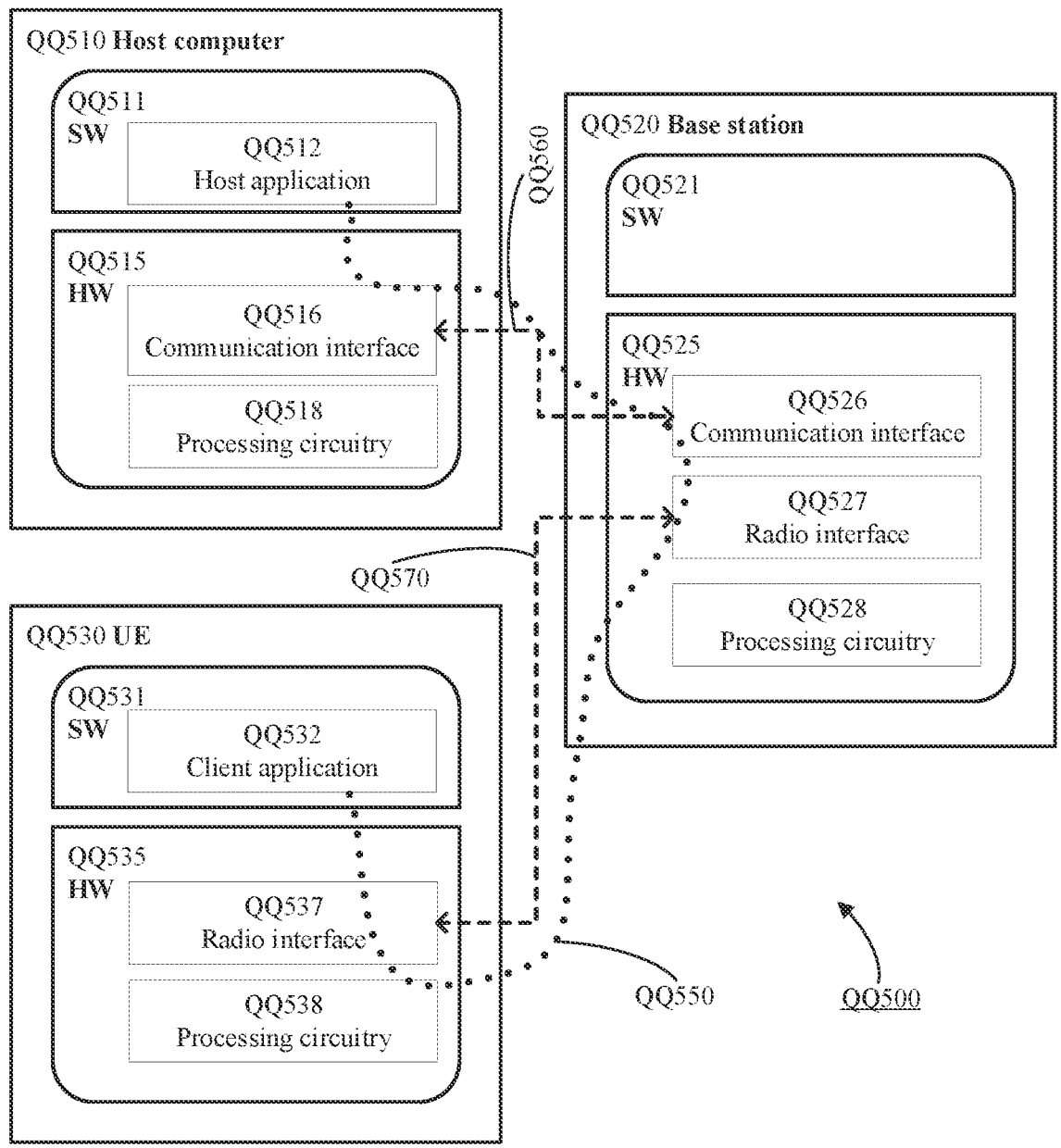
FIG. 7 illustrates a host computer communicating via a base station with a user equipment over a partially wireless connection in accordance with some embodiments.

It is noted that host computer QQ510, base station QQ520 and UE QQ530 illustrated in FIG. 7 may be similar or identical to host computer QQ430, one of base stations QQ412a, QQ412b, QQ412c and one of UEs QQ491, QQ492 of FIG. 6, respectively. This is to say, the inner workings of these entities may be as shown in FIG. 7 and independently, the surrounding network topology may be that of FIG. 6.

In FIG. 7, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the signaling efficiency and thereby provide benefits such as improved capacity, for example.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 8:
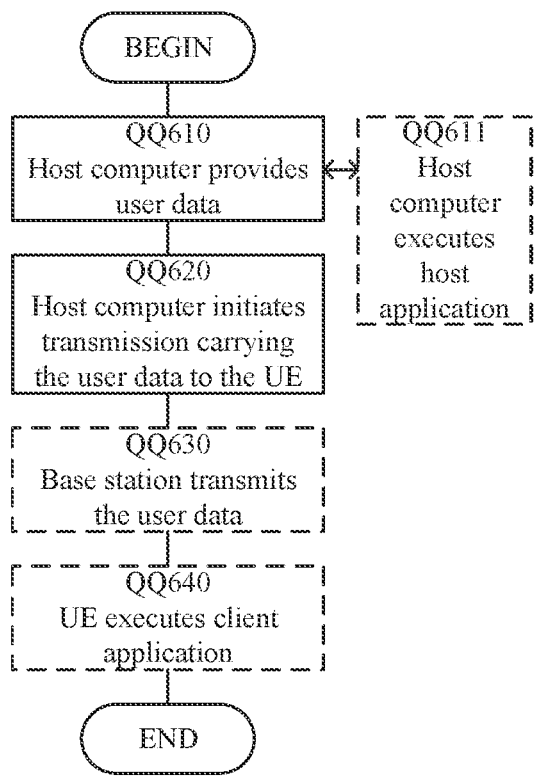
FIG. 8 is a flowchart illustrating example method steps implemented in a communication system including a host computer, a base station and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 9:
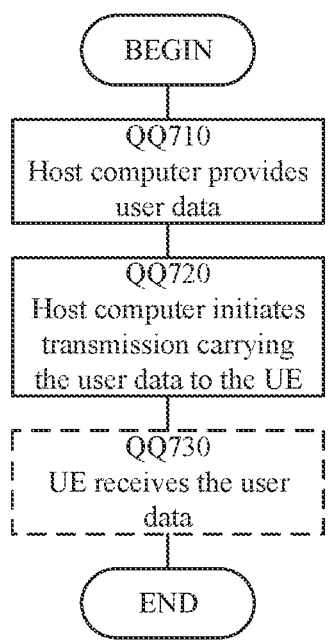
FIG. 9 is a flowchart illustrating example method steps implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 10:
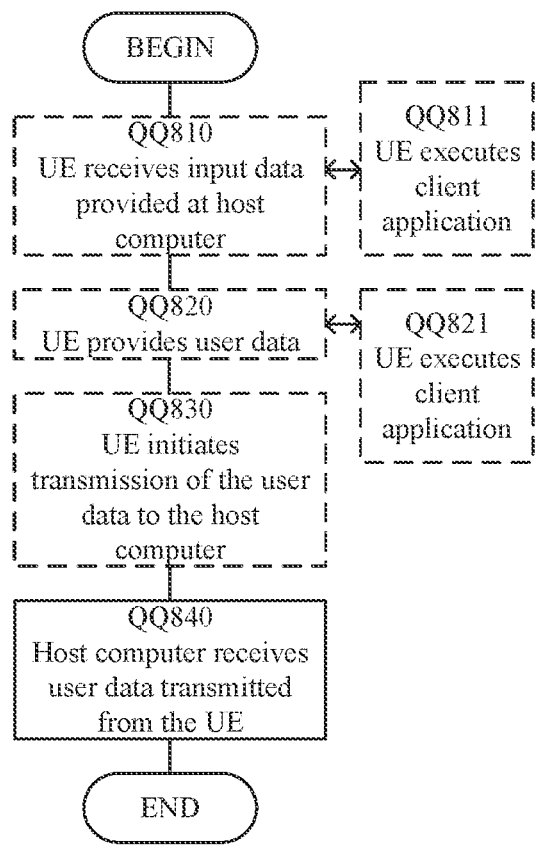
FIG. 10 is a flowchart illustrating example method steps implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 6 and 6. For simplicity of the present disclosure, only drawing references to FIG. 10 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 11:
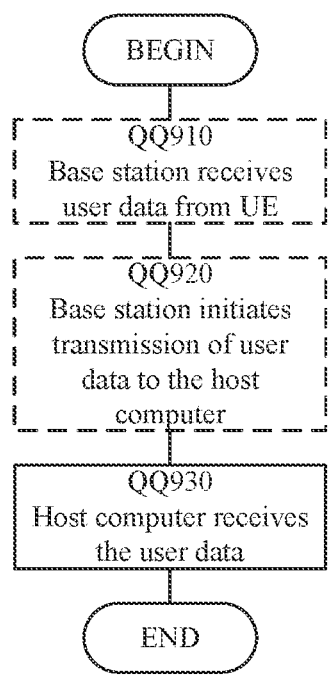
FIG. 11 is a flowchart illustrating example method steps implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

SOME EXAMPLE EMBODIMENTS

Group A Embodiments

A1. A method performed by a wireless device—transmitter apparatus—for beam forming, wherein the transmitter apparatus is configured to transmit signals to a receiver apparatus using a transmission beam selected from a plurality of available transmission beams, wherein the receiver apparatus is configured to receive the signals using a reception beam selected from a plurality of available reception beams, and wherein a set of the available transmission beams and a set of the available reception beams are for beam selection measurements by the receiver apparatus, the method comprising:
  determining a collection of linear combinations of transmission beams of the set of the available transmission beams;
  determining a collection of linear combinations of reception beams of the set of available reception beams;
  providing an indication of the collection of linear combinations of reception beams to the receiver apparatus; and
  transmitting each of the linear combinations of transmission beams of the collection of linear combinations of transmission beams for beam selection measurements by the receiver apparatus.

A2. The method of any of the previous embodiments in Group A, further comprising:
  providing user data; and
  forwarding the user data to a host computer via the transmission to the base station.

Group B Embodiments

B1. A method performed by a base station—transmitter apparatus—for beam forming, wherein the transmitter apparatus is configured to transmit signals to a receiver apparatus using a transmission beam selected from a plurality of available transmission beams, wherein the receiver apparatus is configured to receive the signals using a reception beam selected from a plurality of available reception beams, and wherein a set of the available transmission beams and a set of the available reception beams are for beam selection measurements by the receiver apparatus, the method comprising:
  determining a collection of linear combinations of transmission beams of the set of the available transmission beams;
  determining a collection of linear combinations of reception beams of the set of available reception beams;
  providing an indication of the collection of linear combinations of reception beams to the receiver apparatus; and
  transmitting each of the linear combinations of transmission beams of the collection of linear combinations of transmission beams for beam selection measurements by the receiver apparatus.

B2. The method of any of the previous embodiments in Group B, further comprising:
  obtaining user data; and
  forwarding the user data to a host computer or a wireless device.

Group C Embodiments

C1. A wireless device for beamforming, the wireless device comprising:
  processing circuitry configured to perform any of the steps of any of the Group A embodiments; and
  power supply circuitry configured to supply power to the wireless device.

C2. A base station for beam forming, the base station comprising:
  processing circuitry configured to perform any of the steps of any of the Group B embodiments;
  power supply circuitry configured to supply power to the base station.

C3. A user equipment (UE) for beam forming, the UE comprising:
  an antenna configured to send and receive wireless signals;
  radio front-end circuitry connected to the antenna and to processing circuitry, and configured to condition signals communicated between the antenna and the processing circuitry;
  the processing circuitry being configured to perform any of the steps of any of the Group A embodiments;
  an input interface connected to the processing circuitry and configured to allow input of information into the UE to be processed by the processing circuitry;
  an output interface connected to the processing circuitry and configured to output information from the UE that has been processed by the processing circuitry; and
  a battery connected to the processing circuitry and configured to supply power to the UE.

Group D Embodiments

D1. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to perform any of the steps described for the Group B embodiments.

D2. The communication system of embodiment D1 further including the base station.

D3. The communication system of any of embodiments D1 through D2, further including the UE, wherein the UE is configured to communicate with the base station.

D4. The communication system of any of embodiments D1 through D3, wherein:
  the processing circuitry of the host computer is configured to execute a host application, thereby providing the user data; and
  the UE comprises processing circuitry configured to execute a client application associated with the host application.

D5. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station performs any of the steps described for the Group B embodiments.

D6. The method of embodiment D5, further comprising, at the base station, transmitting the user data.

D7. The method of any of embodiments D5 through D6, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform the method of any of embodiments D5 through D7.

D9. A communication system including a host computer comprising:
  processing circuitry configured to provide user data; and
  a communication interface configured to forward user data to a cellular network for transmission to a user equipment (UE),
  wherein the UE comprises a radio interface and processing circuitry, the UE's components configured to perform any of the steps described for the Group A embodiments.

D10. The communication system of embodiment D9, wherein the cellular network further includes a base station configured to communicate with the UE.

D11. The communication system of any of embodiments D9 through D10, wherein:
  the processing circuitry of the host computer is configured to execute a host application, thereby providing the user data; and
  the UE's processing circuitry is configured to execute a client application associated with the host application.

D12. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the UE performs any of the steps described for the Group A embodiments.

D13. The method of embodiment D12, further comprising at the UE, receiving the user data from the base station.

D14. A communication system including a host computer comprising:
  communication interface configured to receive user data originating from a transmission from a user equipment (UE) to a base station,
  wherein the UE comprises a radio interface and processing circuitry, the UE's processing circuitry configured to perform any of the steps described for the Group A embodiments.

D15. The communication system of embodiment D14, further including the UE.

D16. The communication system of any of embodiments D14 through D15, further including the base station, wherein the base station comprises a radio interface configured to communicate with the UE and a communication interface configured to forward to the host computer the user data carried by a transmission from the UE to the base station.

D17. The communication system of any of embodiments D14 through D16, wherein:
  the processing circuitry of the host computer is configured to execute a host application; and
  the UE's processing circuitry is configured to execute a client application associated with the host application, thereby providing the user data.

D18. The communication system of any of embodiments D14 through D17, wherein:
  the processing circuitry of the host computer is configured to execute a host application, thereby providing request data; and the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps described for the Group A embodiments.

D20. The method of embodiment D19, further comprising, at the UE, providing the user data to the base station.

D21. The method of any of embodiments D19 through D20, further comprising:
at the UE, executing a client application, thereby providing the user data to be transmitted; and
at the host computer, executing a host application associated with the client application.

D22. The method of any of embodiments D19 through D21, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A user equipment (UE) configured to communicate with a base station, the UE comprising a radio interface and processing circuitry configured to perform the method of any of embodiments D19 through D22.

D24. A communication system including a host computer comprising a communication interface configured to receive user data originating from a transmission from a user equipment (UE) to a base station, wherein the base station comprises a radio interface and processing circuitry, the base station's processing circuitry configured to perform any of the steps described for the Group B embodiments.

D25. The communication system of embodiment D24 further including the base station.

D26. The communication system of any of embodiments D24 through D25, further including the UE, wherein the UE is configured to communicate with the base station.

D27. The communication system of any of embodiments D24 through D25, wherein:
the processing circuitry of the host computer is configured to execute a host application;
the UE is configured to execute a client application associated with the host application, thereby providing the user data to be received by the host computer.

D28. A method implemented in a communication system including a host computer, a base station and a user equipment (UE), the method comprising:
at the host computer, receiving, from the base station, user data originating from a transmission which the base station has received from the UE, wherein the UE performs any of the steps described for the Group A embodiments.

D29. The method of embodiment D28, further comprising at the base station, receiving the user data from the UE.

D30. The method of any of embodiments D28 through D29, further comprising at the base station, initiating a transmission of the received user data to the host computer.

D31. A method implemented in a communication system including a host computer, a base station and a user equipment (UE), the method comprising:
at the host computer, receiving, from the base station, user data originating from a transmission which the base station has received from the UE, wherein the base station performs any of the steps described for the Group B embodiments.

D32. The method of embodiment D31, further comprising at the base station, receiving the user data from the UE.

D33. The method of any of embodiments D31 through D32, further comprising at the base station, initiating a transmission of the received user data to the host computer.

The invention claimed is:

1. A method for a transmitter apparatus configured to transmit signals to a receiver apparatus using a transmission beam selected from a plurality of available transmission beams, wherein the receiver apparatus is configured to receive the signals using a reception beam selected from a plurality of available reception beams, and wherein a set of the available transmission beams and a set of the available reception beams are for beam selection measurements by the receiver apparatus, the method comprising:
determining, jointly, a collection of linear combinations of transmission beams of the set of the available transmission beams and a collection of linear combinations of reception beams of the set of available reception beams; and
transmitting each of the linear combinations of transmission beams of the collection of linear combinations of transmission beams for beam selection measurements by the receiver apparatus.

2. The method of claim 1, further comprising:
providing an indication of the collection of linear combinations of reception beams to the receiver apparatus.

3. The method of claim 1, wherein:
a cardinality of the collection of linear combinations of transmission beams is lower than a cardinality of the set of the available transmission beams; and/or
a cardinality of the collection of linear combinations of reception beams is lower than a cardinality of the set of the available reception beams.

4. The method of claim 3, wherein the determination of the collection of linear combinations of transmission beams and the collection of linear combinations of reception beam comprises determining the cardinality of the collection of linear combinations of transmission beams and/or the cardinality of the collection of linear combinations of reception beam based on one or more of:
a sparsity of a channel between the transmitter apparatus and the receiver apparatus; and
properties of a compression matrix representing the collection of linear combinations of transmission beams and the collection of linear combinations of reception beams.

5. The method of claim 1, further comprising:
receiving a transmission beam selection measurement report from the receiver apparatus; and
selecting the transmission beam from the plurality of available transmission beams in accordance with the received transmission beam selection measurement report.

6. The method of claim 1, wherein at least one of the linear combinations of transmission beams of the collection of linear combinations of transmission beams is a linear combination of at least two of the transmission beams of the set of the available transmission beams, and/or wherein at least one of the linear combinations of reception beams of the collection of the collection of linear combinations of reception beams is a linear combination of at least two of the reception beams of the set of the available reception beams.

7. The method of claim 1, wherein each of the linear combinations of transmission beams of the collection of linear combinations of transmission beams is a unique linear combination of all of the transmission beams of the set of the available transmission beams, and/or wherein each of the linear combinations of reception beams of the collection of the collection of linear combinations of reception beams is a unique linear combination of all of the reception beams of the set of the available reception beams.

8. The method of claim 1, wherein the collection of linear combinations of transmission beams is defined by a Grassmannian coding matrix, and/or wherein the collection of linear combinations of reception beams is defined by a Grassmannian coding matrix.

9. The method of claim 1, wherein the collection of linear combinations of transmission beams, representable by a matrix $B_{TX}$, and the collection of linear combinations of reception beams, representable by a matrix $B_{RX}$, are determined such that $A^H A$ is a substantially block diagonal matrix, wherein $A=B_{TX} \otimes B_{RX}$ where $\otimes$ represents a Kronecker product.

10. The method of claim 1, wherein the set of the available transmission beams consists of a minimum number of transmission beams spanning the plurality of available transmission beams, and/or wherein the set of the available reception beams consists of a minimum number of reception beams spanning the plurality of available reception beams.

11. The method of claim 1, wherein the set of the available transmission beams and/or the set of the available reception beams comprises discrete Fourier transform, DFT, beams, wherein a beam direction of any DFT beam corresponds to a harmonic frequency.

12. The method of claim 1, wherein transmitting comprises one or more of:
transmitting each of the linear combinations of transmission beams of the collection of linear combinations of transmission beams in a respective transmission time resource, at least some of the respective time resources being different; and
transmitting each of the linear combinations of transmission beams of the collection of linear combinations of transmission beams in a respective transmission frequency resource, at least some of the respective frequency resources being different.

13. The method of claim 1, wherein the method is applied during a training phase for beam selection.

14. A method for a receiver apparatus configured to receive signals from a transmitter apparatus via a transmission beam selected from a plurality of available transmission beams and using a reception beam selected from a plurality of available reception beams, wherein a set of the available transmission beams and a set of the available reception beams are for beam selection measurements by the receiver apparatus, the method comprising:
receiving, using each linear combination of reception beams of a collection of linear combinations of reception beams, a number of measurement signals for beam selection measurements from the transmitter apparatus, wherein the number of measurement signals correspond to a collection of linear combinations of transmission beams of the set of available transmission beams; and
performing beam selection measurements on the number of measurement signals for selection of the transmission beam from the plurality of available transmission beams and for selection of the reception beam from the plurality of available reception beams.

15. The method of claim 14, further comprising:
transmitting a transmission beam selection measurement report to the transmitter apparatus for selection of the transmission beam from the plurality of available transmission beams.

16. The method of claim 14, wherein performing beam selection measurements comprises determining a quality metric for each combination of a transmission beam of the set of available transmission beams and a reception beam of the set of available reception beams based on the beam selection measurements.

17. The method of claim 14, wherein performing beam selection measurements comprises subjecting the number of received measurement signals to matched filtering based on the collection of linear combinations of transmission beams and the collection of linear combinations of reception beam.

18. A method for a system comprising a transmitter apparatus and a receiver apparatus, wherein the transmitter apparatus is configured to transmit signals to the receiver apparatus using a transmission beam selected from a plurality of available transmission beams, wherein the receiver apparatus is configured to receive the signals using a reception beam selected from a plurality of available reception beams, and wherein a set of the available transmission beams and a set of the available reception beams are for beam selection measurements by the receiver apparatus, the method comprising:
jointly determining, by the transmitter apparatus, a collection of linear combinations of transmission beams of the set of the available transmission beams and a collection of linear combinations of reception beams of the set of available reception beams;
providing, by the transmitter apparatus to the receiver apparatus, an indication of the collection of linear combinations of reception beams;
acquiring, by the receiver apparatus from the transmitter apparatus, the indication of the collection of linear combinations of reception beams;
transmitting, by the transmitter apparatus, each of the linear combinations of transmission beams of the collection of linear combinations of transmission beams;
receiving, by the receiver apparatus, each of the linear combinations of transmission beams of the collection of linear combinations of transmission beams using each of the linear combinations of reception beams of the collection of linear combinations of reception beams; and
performing, by the receiver apparatus, beam selection measurements on the received linear combinations of transmission beams for selection of the transmission beam from the plurality of available transmission beams and for selection of the reception beam from the plurality of available reception beams.

* * * * *